(12) United States Patent
Matsumura et al.

(10) Patent No.: US 10,634,960 B2
(45) Date of Patent: Apr. 28, 2020

(54) LIQUID CRYSTAL DISPLAY DEVICE

(71) Applicant: SHARP KABUSHIKI KAISHA, Sakai, Osaka (JP)

(72) Inventors: Satoshi Matsumura, Sakai (JP); Mitsuhiro Murata, Sakai (JP); Takuma Tomotoshi, Sakai (JP); Yosuke Iwata, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/315,116

(22) PCT Filed: Jul. 3, 2017

(86) PCT No.: PCT/JP2017/024310
§ 371 (c)(1),
(2) Date: Jan. 3, 2019

(87) PCT Pub. No.: WO2018/008584
PCT Pub. Date: Jan. 11, 2018

(65) Prior Publication Data
US 2019/0310525 A1 Oct. 10, 2019

(30) Foreign Application Priority Data
Jul. 6, 2016 (JP) ................................ 2016-134393

(51) Int. Cl.
*G02F 1/1343* (2006.01)
*G02F 1/1368* (2006.01)
*G02F 1/137* (2006.01)

(52) U.S. Cl.
CPC ........ *G02F 1/134309* (2013.01); *G02F 1/137* (2013.01); *G02F 1/1343* (2013.01);
(Continued)

(58) Field of Classification Search
CPC ............. G02F 1/134309; G02F 1/1343; G02F 1/1368; G02F 1/137; G02F 2001/13706;
(Continued)

(56) References Cited

U.S. PATENT DOCUMENTS

2002/0041354 A1    4/2002  Noh et al.
2013/0033666 A1*   2/2013  Chung .............. G02F 1/133707
                                                          349/126

FOREIGN PATENT DOCUMENTS

JP          2002-182230 A       6/2002

* cited by examiner

*Primary Examiner* — Nathanael R Briggs
(74) *Attorney, Agent, or Firm* — ScienBiziP, P.C.

(57) ABSTRACT

A liquid crystal display device including an upper substrate and a lower substrate; and a liquid crystal layer sandwiched between the upper and lower substrates, wherein the lower substrate includes a first electrode and a second electrode and a third electrode arranged in a layer different from the first electrode, the first electrode has multiple linear portions and an opening is provided between the linear portions, the second electrode and the third electrode are a pair of comb-shaped electrodes, each of the comb-shaped electrodes has a trunk portion and multiple branch portions branching from the trunk portion, at least one of the branch portions of the third electrode has a narrow portion which is narrowest and a projection portion which is wider than the narrow portion, one of angles on the upper side and on the opening side formed by a contour line of the opening on each of the left and right sides of the projection portion and the narrow portion of the branch portion of the third electrode in the opening is an obtuse angle or a right angle and the other is an acute angle or a right angle, and a length of the narrow portion on each side of the projection portion in the opening of the first electrode is specified.

11 Claims, 32 Drawing Sheets

(52) U.S. Cl.
CPC ...... *G02F 1/1368* (2013.01); *G02F 1/134363* (2013.01); *G02F 2001/13706* (2013.01); *G02F 2001/134372* (2013.01); *G02F 2201/124* (2013.01)

(58) Field of Classification Search
CPC ... G02F 2201/124; G02F 2001/134372; G02F 1/134363
See application file for complete search history.

— Region 1

— Region 2

Liquid crystal initial azimuth

—— Upper-layer electrode (i) voltage
- - - - Lower-layer electrode (ii) voltage
·········· Lower-layer electrode (iii) voltage Liquid crystal initial azimuth Liquid crystal
initial azimuth Example 1  SN ratio 9.49

Liquid crystal initial azimuth

Example 2  SN ratio 9.13

Example 3   SN ratio 9.22

Example 4   SN ratio 9.42

Example 5   SN ratio 9.64

Example 6   SN ratio 8.98

Example 7   SN ratio 9.22

Example 8   SN ratio 8.83

Example 9  SN ratio 9.42

Example 10  SN ratio 9.64

Example 11  SN ratio 8.57

Example 12  SN ratio 9.2

Example 13  SN ratio 9.29

Example 14  SN ratio 9.66

Example 15  SN ratio 9.53

Example 16  SN ratio 9.13

Example 17  SN ratio 9.23

Example 18  SN ratio 9.06

Example 19  SN ratio 9.63

Comparative Example 2  SN ratio 7.96

Comparative Example 3  SN ratio 7.15

Comparative Example 4  SN ratio 7.35

Comparative Example 5  SN ratio 8.09

Comparative Example 6   SN ratio 7.06

Comparative Example 7   SN ratio 7

Comparative Example 8   SN ratio 4.74

Liquid crystal initial azimuth

SN ratio 0∼8.5

SN ratio 8.5∼17

Example 20   SN ratio 9.61

Example 21  SN ratio 9.49

Example 22  SN ratio 8.57

Example 23  SN ratio 9.49

Example 24  SN ratio 8.86

Example 25  SN ratio 9.48

Example 26  SN ratio 8.94

Comparative Example 9  SN ratio 8.18

Comparative Example 10  SN ratio 8.04

Comparative Example 11  SN ratio 7.55

Comparative Example 12   SN ratio 5.21

Liquid crystal initial azimuth (i) 0V
(ii) 1.7V/−1.7V
(iii) −1.7V/1.7V 6.0V
1.7V — 1.7V
Amplitude center =0V
−1.7V — −1.7V
−6.0V —— Upper-layer electrode (i) voltage
----- Lower-layer electrode (ii) voltage
·········· Lower-layer electrode (iii) voltage Liquid crystal initial azimuth

LIQUID CRYSTAL DISPLAY DEVICE

TECHNICAL FIELD

The present invention relates to a liquid crystal display device, and more particularly to a liquid crystal display device suitable for use under both a high temperature environment and a low temperature environment such as a car navigation system.

BACKGROUND ART

A liquid crystal display device is constructed while a liquid crystal display element is sandwiched between a pair of glass substrates. By utilizing the features such as thinness, light weight, and low power consumption, the liquid crystal display device is widely used in a car navigation, an electronic book, a photo frame, industrial equipment, a television, a personal computer, a smartphone, and a tablet terminal, which are indispensable for everyday life and business. In these applications, liquid crystal display devices of various modes relating to the electrode arrangement and design of a substrate are studied in order to change optical characteristics of a liquid crystal layer.

For example, a vertical alignment (VA) mode, such as a multi-domain vertical alignment (MVA) mode, in which liquid crystal molecules having negative anisotropy of dielectric constant are vertically aligned with respect to a substrate surface, an in-plane switching (IPS) mode in which the liquid crystal molecules having positive or negative anisotropy of dielectric constant are horizontally aligned with respect to the substrate surface to apply a lateral electric field to the liquid crystal layer, and a fringe field switching (FFS) mode can be cited as a recent display system of the liquid crystal display device.

Among these, the FFS mode is widely used in smartphones and tablet terminals in recent years. As an FFS mode liquid crystal display device, for example, disclosed is the FFS mode liquid crystal display device including: a first and second transparent insulating substrates that are disposed opposite to each other with a predetermined distance with a liquid crystal layer containing multiple liquid crystal molecules interposed therebetween; multiple gate bus lines and data bus lines formed on the first transparent substrate and arranged in a matrix so as to restrict a unit pixel; a thin-film transistor provided at an intersection of the gate bus line and the data bus line; a counter electrode disposed in each unit pixel and made of a transparent conductor; and a pixel electrode disposed in each unit pixel being insulated from the counter electrode so as to form a fringe field together with the counter electrode, the pixel electrode being made of a transparent conductor and including multiple upper slits and lower slits arranged at a predetermined inclination such that a symmetrical shape is formed with a long side of the pixel as a center (for example, see Patent Literature 1).

CITATION LIST

Patent Literature

Patent Literature 1: JP-A-2002-182230

SUMMARY OF INVENTION

Technical Problem

It is disclosed that the FFS mode liquid crystal display device described in Patent Literature 1 has wide viewing angle characteristics and improves the low aperture ratio and transmittance of the IPS mode liquid crystal display device (see, for example, FIG. 6 described in Patent Literature 1. FIG. 6 described in Patent Literature 1 shows a planar pixel structure of the FFS mode liquid crystal display device). However, in the FFS mode liquid crystal display device described in Patent Literature 1, the liquid crystal can be forcibly responded by applying an electric field at the time of rising, but at the time of falling, since the application of the electric field is stopped and the liquid crystal is made to respond depending on the viscoelasticity of the liquid crystal, the response is slow compared to the vertical alignment mode, and there is room for improvement in response characteristics.

An example of the FFS mode liquid crystal display device described in Patent Literature 1 will be described with reference to FIG. 59. FIG. 59 is a schematic cross-sectional view showing the electrode structure and initial alignment of liquid crystal molecules of a liquid crystal display device having a conventional FFS mode electrode structure. Note that FIG. 59 is also a schematic cross-sectional view of a liquid crystal display device of Comparative Embodiment 1 described later. On a lower substrate 1010, upper-layer electrodes (iv) each having a slit are disposed, and a planar lower-layer electrode (v) is disposed with an insulating layer 1013 interposed between the upper-layer electrodes (iv) and the lower-layer electrode (v). The liquid crystal display device, at the time of rising, responds by applying a voltage equal to or higher than the threshold voltage to the upper-layer electrodes (iv) and generating a fringe electric field (in the present description, the threshold voltage means a voltage value that gives a transmittance of 5% when the transmittance in a bright state is set to 100%), and at the time of falling, responds by setting the potential difference between the upper-layer electrodes (iv) and the lower-layer electrode (v) to be less than the threshold voltage and stopping (weakening) the fringe electric field.

In the conventional FFS mode liquid crystal display device, as described above, a fringe electric field is generated by electrodes (a counter electrode and pixel electrodes each provided with multiple slits and arranged in each unit pixel insulated from the counter electrode so as to form a fringe electric field together with the counter electrode. Hereinafter, such electrodes are also referred to as FFS electrodes) having an FFS mode electrode structure of the lower substrate, and switching at the time of rising is performed by rotating the liquid crystal molecules in the vicinity of the lower substrate in the same direction in the horizontal plane. Switching at the time of falling is performed by stopping (weakening) the fringe electric field so as to return the liquid crystal molecules to the original alignment state by viscoelasticity. However, in the conventional FFS mode liquid crystal display device, there is a region where the electric field for rotating the liquid crystal molecules is weak in the liquid crystal layer, and it takes time to rotate the liquid crystal molecules in the region. In addition, at this time, the liquid crystal molecules basically rotate in the same direction when the longitudinal directions of multiple slits are regularly arranged in parallel, so the distortion due to the elastic deformation of the liquid crystal in the horizontal plane is small. Therefore, when switching at the time of falling is performed by stopping the electric field, the restoring force due to the elastic distortion working when returning to the original alignment state is small and the response is slow. Therefore, both the switching at the time of rising and the switching at the time of falling have a slow response time.

Here, the present inventors focused attention on the electrode structure of the lower substrate of the liquid crystal display device. Although the conventional FFS mode liquid crystal display device is composed of electrodes in which the electrodes of the lower substrate are arranged in two layers and which can apply two different voltages, the liquid crystal display device is composed of electrodes in which the electrodes of the lower substrate are arranged in at least two layers and which can apply three different voltages and a pair of comb-shaped electrodes are arranged in at least one layer. Then, the present inventors have found that a high-speed response was also realized in addition to a wide viewing angle in such a liquid crystal display device. For example, a pair of comb-shaped electrodes capable of applying two different voltages always generate a lateral electric field by applying voltages while inverting their polarities with an amplitude center set to 0 V so that their polarities are opposite to each other, and the liquid crystal display device is driven by applying a voltage corresponding to the gray scale while inverting its polarity to the pixel electrodes provided in a layer different from the pair of comb-shaped electrodes. As a result, as will be described in detail later, the response speed is faster than in the FFS mode, and the moving image visibility is further improved. Hereinafter, such a driving system is also referred to as a first driving system. The amplitude center means an average value (intermediate value) between a maximum value and a minimum value of the AC voltage.

Here, in the first driving system, there is a case where black floating (the transmittance does not sufficiently decrease during black display) occurs because the voltage is always applied to the lower-layer electrode of the lower substrate, and there was room for contrivance to prevent this black floating and improve the contrast ratio. In view of the above, the present inventors further have conceived that projections are provided on a part of the branch portions of the pair of comb-shaped electrodes in the liquid crystal display device. As a result, the liquid crystal can be made to have a desired alignment during black display of the first driving system, and the transmittance can be sufficiently lowered.

The liquid crystal display device, as in a voltage application method in the conventional FFS mode liquid crystal display device, can be also driven by a method in which both of the pair of comb-shaped electrodes are set to 0 V, and a voltage corresponding to the gray scale is applied to a pixel electrode provided in a layer different from the pair of comb-shaped electrodes, thereby generating a fringe electric field between the upper and lower-layer electrodes to drive the liquid crystal display device (hereinafter, such a driving system is also referred to as a second driving system. In the second driving system, a transmittance equivalent to that in the FFS mode can be realized). However, the present inventors have found a problem that, in the liquid crystal display device, in particular, when switching is made from low gray-scale display to high gray-scale display, the electric field generated between the projection portion of the comb-shaped electrode and the pixel electrode destabilizes the alignment of the liquid crystal. The liquid crystal display device has room for further contrivance to further improve the transmittance during white display of the second driving system.

In view of such a current state of the art and, it is an object of the present invention to provide a liquid crystal display device capable of achieving a high transmittance (high contrast ratio) and a wide viewing angle and realizing high-speed response.

Solution to Problem

The present inventors, in a liquid crystal display device in which the electrode of the lower substrate includes a pair of comb-shaped electrodes and pixel electrodes provided in a layer different from the pair of comb-shaped electrodes, and the first driving system or the second driving system can be realized according to a method for applying a voltage, specified the shape of the electrode, and reduced the gap between the pixel electrode and the projection portion of the branch portion of the comb-shaped electrode when the main surface of the substrate was viewed in a plan view. The present inventors have arrived at the solution in which the above problem is solved by the thus specified electrode structure which can appropriately control the electric field in the gap between the pixel electrode and the projection portion of the branch portion of the comb-shaped electrode, completing the present invention.

That is, one aspect of the present invention may be a liquid crystal display device including an upper substrate and a lower substrate; and a liquid crystal layer sandwiched between the upper and lower substrates, wherein the lower substrate includes a first electrode and a second electrode and a third electrode arranged in a layer different from the first electrode, the first electrode has multiple linear portions and an opening is provided between the linear portions, the second electrode and the third electrode are a pair of comb-shaped electrodes, each of the comb-shaped electrodes has a trunk portion and multiple branch portions branching from the trunk portion, at least one of the branch portions of the third electrode has a narrow portion which is narrowest and a projection portion which is wider than the narrow portion, the projection portion is present in the opening of the first electrode when the lower substrate is viewed in a plan view so that the projection portion is directed to an upper side of upper, lower, right, and left sides, one of angles on the upper side and on the opening side formed by a contour line of the opening on each of the left and right sides of the projection portion and the narrow portion of the branch portion of the third electrode in the opening is an obtuse angle or a right angle and the other is an acute angle or a right angle, the projection portion satisfies following Formulae (1) and (2-1) to (2-3) where A is a length of the narrow portion on the side where the angle is an obtuse angle or a right angle and B is a length of the narrow portion on the side where the angle is an acute angle or a right angle, among the left and right sides of the projection portion, the projection portion has a quadrilateral shape or a shape in which a triangular portion including one of apexes of a quadrilateral shape is cut out from the quadrilateral shape, the projection portion satisfies following Formulae (3) and (4) where C1 is a length of a portion of the triangular portion along the linear portion of the first electrode and C2 is a length of a portion of the triangular portion along the linear portion of the branch portion of the second electrode, and the liquid crystal layer contains liquid crystal molecules aligned in the horizontal direction when no voltage is applied, $$0 \ \mu m \leq A \leq 1.5 \ \mu m \tag{1}$$

$$0 \ \mu m \leq B \leq -0.5A+2 \ \mu m \text{ when } 0 \ \mu m \leq A \leq 0.5 \ \mu m \tag{2-1}$$

$$0 \ \mu m \leq B \leq 0.5A+1.5 \ \mu m \text{ when } 0.5 \ \mu m < A \leq 1.0 \ \mu m \tag{2-2}$$

$$0 \ \mu m \leq B \leq -0.5A+2.5 \ \mu m \text{ when } 1.0 \ \mu m < A \leq 1.5 \ \mu m \tag{2-3}$$

$$0 \ \mu m \leq C1 \leq 3.5 \ \mu m \tag{3}$$

$$0 \ \mu m \leq C2 \leq -C1+3.5 \ \mu m \tag{4}$$

The liquid crystal display device of the present invention is different from the invention described in Patent Literature 1 in that the electrodes of the lower substrate include a pair of comb-shaped electrodes and an electrode provided in a layer different from the pair of comb-shaped electrodes, and the branch portion of the comb-shaped electrode has a projection portion.

When the lower substrate is viewed in a plan view so that the projection portion is directed to an upper side of upper, lower, left, and right sides, the contour line of the opening (the edge on the opening side of the linear portion of the first electrode) of the opening and the narrow portion of the branch portion (which indicates the upper edge [contour line] of the narrow portion when the lower substrate is viewed in a plan view so that the projection portion is directed to an upper side of upper, lower, left, and right sides) of the third electrode intersect each other at two places, on the left side and the right side of the projection portion and form an angle. The above-described angle on the upper side and on the opening side formed by the contour line of the opening and the narrow portion of the branch portion of the third electrode is, on the left side of the projection portion, the angle formed by the contour line of the opening and the narrow portion of the branch portion of the third electrode, which is an angle on the upper right side, and on the right side of the projection portion, the angle formed by the contour line of the opening and the narrow portion of the branch portion of the third electrode, which is an angle on the upper left side.

The length of the narrow portion on the side where the angle is an obtuse angle or a right angle is the length of the narrow portion in the opening on the side where the angle is an obtuse angle or a right angle among the left narrow portion and the right narrow portion of the projection portion, and the length of the narrow portion on the side where the angle is an acute angle or a right angle is the length of the narrow portion in the opening on the side where the angle is an acute angle or a right angle among the left narrow portion and the right narrow portion of the projection portion. For example, in FIG. 3, the angle on the obtuse angle side is indicated by p, and the angle on the acute angle side is indicated by q. In FIG. 4, the length of the narrow portion on the side where the angle is an obtuse angle is represented by A, and the length of the narrow portion on the side where the angle is an acute angle is represented by B. Note that, the length of the narrow portion is the length of the upper edge of the narrow portion when the lower substrate is viewed in a plan view so that the projection portion is directed to an upper side of upper, lower, left, and right sides.

In the case where both of the angles of the upper side and the opening side formed by the contour line of the opening and the narrow portion of the branch portion of the third electrode are right angles on the left side and the right side of the projection portion, only the case of satisfying above Formulae (1) and (2-1) to (2-3) is required where the length of the narrow portion on either one of the left side and the right side of the projection portion is A and the length of the narrow portion on the other side is B, and thereby the requirements of above Formulae (1) and (2-1) to (2-3) are satisfied.

The "angle on the upper side and on the opening side formed by a contour line of the opening on each of the left and right sides of the projection portion and the narrow portion of the branch portion of the third electrode" can be an angle formed by the contour line of the opening and the narrow portion of the branch portion of the third electrode excluding a portion where the projection portion is formed, in a case where the contour line of the opening and the contour line of the projection portion of the branch portion of the third electrode intersect each other. Specifically, as shown in FIG. 46, when the contour line of the opening and the contour line of the projection portion intersect each other on the left side of the projection portion, an angle p on the upper side and on the opening side formed by the contour line of the opening and the narrow portion (the portion indicated by the broken line on the lower-layer electrode (iii) in FIG. 46) of the branch portion excluding the portion where the projection portion is formed can be the "angle on the upper side and on the opening side formed by the contour line of the opening and the narrow portion of the branch portion of the third electrode" according to the present invention. In FIG. 46, the length A of the narrow portion on the side where the angle p is an obtuse angle is 0 μm.

The contour line of the opening and the narrow portion of the branch portion of the third electrode may be bent but are preferably not bent and linear.

In addition, the projection portion may be provided only in one of the side portions (short side) of the branch portion of the third electrode, or may be provided in both of them. In the case where the projection portion is provided in both side portions of the branch portion of the third electrode, when the lower substrate is viewed in a plan view so that one projection portion is directed to an upper side of upper, lower, left, and right sides, above Formulae (1) and (2-1) to (2-3) may be satisfied. However, when the lower substrate is viewed in a plan view so that the projection portion is directed to an upper side of upper, lower, left, and right sides for each of the both projection portions, it is preferred that the both projection portions satisfy above Formulae (1) and (2-1) to (2-3).

As is apparent from above Formulae (1) and (2-1) to (2-3), one or both of the above A and the above B may be 0 μm. In other words, as long as Formulae (1) and (2-1) to (2-3) are satisfied, in the opening, the narrow portion may not be required on the left side and/or the right side of the projection portion.

In the present description, satisfying Formulae (2-1) to (2-3) means that the length of B satisfies any one of Formulae (2-1) to (2-3) determined according to the length of A.

At least one of the multiple branch portions of the third electrode includes a narrow portion which is narrowest and a projection portion which is wider than the narrow portion and may satisfy Formulae (1) and (2-1) to (2-3) for at least one of the projection portions, but each of the projection portions preferably satisfies Formulae (1) and (2-1) to (2-3). Each of the multiple branch portions of the third electrode includes a narrow portion which is narrowest and a projection portion which is wider than the narrow portion, and each of the branch portions of the third electrode preferably includes also at least one projection portion satisfying Formulae (1) and (2-1) to (2-3), and each of the projection portions of the branch portions of the third electrode more preferably satisfies Formulae (1) and (2-1) to (2-3).

Note that, the phrase "the projection portion is present in the opening of the first electrode" means that at least a part of the projection portion may be included in the opening of the first electrode, but the projection portion is preferably included in its entirety.

In the first driving system, the third electrode is preferably a comb-shaped electrode to which a voltage of opposite polarity with respect to the voltage applied to the first electrode (pixel electrode) among the pair of comb-shaped electrodes.

Further, by optimization of the electrode structure as described above, destabilization of the alignment does not occur in the second driving system, and a liquid crystal display device capable of suitably realizing each of the first driving system and the second driving system is obtained. In particular, the liquid crystal mode for (completely) switching between the first driving system and the second driving system is further improved.

A preferred shape of the third electrode when the lower substrate is viewed in a plan view will be described below.

The projection portion protrudes on both sides in the short direction of the branch portion of the third electrode in the opening, and preferably has a symmetrical shape with respect to a point on the branch portion of the third electrode. The point on the branch portion of the third electrode may be disposed at the center of a region in the region surrounded by the first electrode and the second electrode. The fact that the point is disposed at the center of the region means that, for example, when the lower substrate is viewed in a plan view, the point is disposed at the center of gravity when the mass is distributed uniformly in the region.

As long as the projection portion is wider than the narrowest portion of the branch portion, the projection portion may be quadrilateral, or have a shape in which a triangular portion including one of apexes of a quadrilateral shape is cut out from the quadrilateral shape. In particular, it is one of preferred embodiments of the present invention that the above-described projection portion has a quadrilateral shape. It is also one of the preferred embodiments of the present invention that the above-described projection portion has a shape in which a triangular portion including one of apexes of a quadrilateral shape is cut out from the quadrilateral shape. One aspect of the present invention may be characterized in that above-mentioned Formulae (3) and (4) are satisfied, where the length of a portion of the triangular portion along the linear portion of the first electrode is C1, and the length of a portion of the triangular portion along the linear portion of the branch portion of the second electrode is C2. Note that, in the case where C1 is 0 μm and C2 is 0 μm, the projection portion has a quadrilateral shape. Here, from the viewpoint of further increasing the response speed of the first driving system, it is more preferred that the projection portion has a shape in which a triangular portion including one of apexes of a quadrilateral shape is cut out from the quadrilateral shape, and satisfies following Formulae (5) and (6).

$$0.5\ \mu m \leq C1 \leq 3.5\ \mu m \quad (5)$$

$$0.5\ \mu m \leq C2 \leq -C1+3.5\ \mu m \quad (6)$$

The projection portion preferably forms an angle of 20° to 90° with respect to the extending direction of the branch portion of the third electrode, more preferably forms an angle of 60° to 90°, and further preferably forms an angle of 80° to 90°.

The extending direction of the linear portion of the first electrode preferably forms an angle of 20° to 90° with respect to the extending direction of the branch portion of the second electrode and/or the third electrode, more preferably forms an angle of 60° to 90°, and further preferably forms an angle of 80° to 90°.

Further, the extending direction of the linear portion of the first electrode and the extending direction of the projection portion of the third electrode preferably form an angle of 0° to 70°, more preferably form an angle of 0° to 30°, and further preferably form an angle of 0° to 100°.

The branch portion of the third electrode may include a cross-shaped portion as a result of formation of projection portions in both edges thereof. The cross-shaped portion means a portion including two linear portions intersecting each other.

The two linear portions may, for example, intersect at a substantially right angle (80° to 90°). The crossing portion of the cross-shaped portion of the branch portion of the third electrode can be disposed at the center of a region in the region surrounded by the first electrode and the second electrode when the lower substrate is viewed in a plan view. The fact that the crossing portion is disposed at the center of the region means that, for example, when the lower substrate is viewed in a plan view, the crossing portion is disposed at the center of gravity when the mass is uniformly distributed in the region.

The liquid crystal display device of the present invention is preferably configured to execute a driving operation of causing an electrode provided in the lower substrate to generate an electric field that rotates a first group of the liquid crystal molecules in a horizontal plane with respect to the main surface of the upper and lower substrates, and rotates a second group of the liquid crystal molecules in a direction opposite to the first group of the liquid crystal molecules in a horizontal plane with respect to the main surface.

Generating the electric field using the electrode provided in the lower substrate may be any method for generating the electric field using at least one electrode selected from the first electrode, the second electrode, and the third electrode. For example, it is preferred that the electric field is always generated between the second electrode and the third electrode when the liquid crystal display device is powered on, the voltage applied to the first electrode during the white display is increased to rotate the liquid crystal molecules, and the voltage of the first electrode is decreased during the black display to reversely rotate the liquid crystal molecules.

In the liquid crystal display device of the present invention, the driving operation preferably causes an electrode provided in the lower substrate to generate an electric field that rotates the liquid crystal molecules so that two or more first regions and two or more second regions are alternately arranged in a pixel, the first regions each rotating the first group of the liquid crystal molecules in a horizontal plane with respect to the main surface, the second regions each rotating the second group of the liquid crystal modules in a direction opposite to the first group of the liquid crystal molecules in a horizontal plane with respect to the main surface. Such an electric field is generated by the first driving system. Note that, the phrase "two or more first regions and two or more second regions are alternately arranged" means that two or more first regions and two or more second regions may be alternately arranged in stripes, or may be alternately arranged in a staggered lattice pattern. Note that, the first group of the liquid crystal molecules means multiple liquid crystal molecules constituting a group of multiple liquid crystal molecules contained in the liquid crystal layer. The same holds true also for the second group of the liquid crystal molecules, and the second group of the liquid crystal molecules means multiple liquid crystal molecules other than the first group of the liquid crystal molecules of the multiple liquid crystal molecules contained in the liquid crystal layer.

In the liquid crystal display device of the present invention, usually the first electrode, the second electrode, and the third electrode are electrically separated from one another, and the voltages at these electrodes can individually be controlled. In other words, usually each of the first electrode, the second electrode, and the third electrode can be set to a different voltage greater than or equal to a threshold voltage.

In the liquid crystal display device of the present invention, the first electrode may be disposed in a layer different from each of the second electrode and the third electrode, but it is preferred that the first electrode is disposed closer to the liquid crystal layer than the second electrode and the third electrode. In addition, the second electrode and the third electrode may be disposed in different layers, but are preferably arranged in the same layer. For example, in the liquid crystal display device of the present invention (more preferably, a liquid crystal display device driven with a lateral electric field), it is preferred to adopt a configuration in which the second electrode and the third electrode provided in the same layer of the lower substrate form a pair of comb-shaped electrodes, and a slit electrode or a comb-shaped electrode is disposed as the first electrode above the second electrode and the third electrode with an insulating layer or the like interposed therebetween. The fact that a pair of comb-shaped electrodes are arranged in the same layer means that each comb-shaped electrode contacts a common member (for example, an insulating layer, a liquid crystal layer, etc.) on a liquid crystal layer side and/or on a side opposite to the liquid crystal layer side.

In the liquid crystal display device of the present invention, preferably a lateral electric field is always applied between the comb-shaped electrodes on the lower-layer side (the opposite side of the liquid crystal layer side) of the two layers of electrodes of the lower substrate, and a voltage is applied to the slit electrode or the comb-shaped electrode on the upper-layer side to drive the slit electrode or the comb-shaped electrode.

One of preferred embodiments of the present invention is a liquid crystal display device in which in a liquid crystal mode in which the initial alignment is horizontal, the lower substrate has a two-layer electrode configuration, the lower-layer electrode is a pair of comb-shaped electrodes, and the upper-layer electrode is a slit electrode.

The first electrode has multiple linear portions. Preferably, the first electrode is provided with the slit or is the comb-shaped electrode. In the present description, the electrode having the comb shape is not referred to as the electrode provided with the slit, but is referred to as a comb-shaped electrode.

The extending direction is the longitudinal direction of the linear electrodes constituting the electrode.

In the liquid crystal display device of the present invention, the liquid crystal driving electrode may be disposed or may not be disposed on the upper substrate, but preferably the liquid crystal driving electrode is not disposed on the upper substrate. That is, it is one of preferred embodiments of the liquid crystal display device of the present invention that the liquid crystal driving electrode is disposed only on the lower substrate.

The liquid crystal display device of the present invention is preferably configured to execute a first driving system and a second driving system in a switching manner, wherein the first driving system executes the driving operation, and the second driving system executes a driving operation of causing the electrode to generate an electric field that rotates the liquid crystal molecules so that the number of first regions is one or less and the number of second regions is one or less in a pixel, the first regions each rotating the first group of the liquid crystal molecules in a horizontal plane with respect to the main surface, the second regions each rotating the second group of the liquid crystal modules in a direction opposite to the first group of the liquid crystal molecules in a horizontal plane with respect to the main surface. The phrase " . . . first regions, . . . second regions are one or less, respectively" means, for example, whether there are one first region and one second region, or, the second region does not exist (the number is zero). Rotating in a horizontal plane may be any method as long as it rotates substantially in one direction in a horizontal plane. In the second driving system, causing the electrode to generate the electric field may be any method for generating the electric field using at least one electrode selected from the first electrode, the second electrode, and the third electrode. For example, in the method, the voltage applied to the first electrode during the white display is increased and the electric field is generated to rotate the liquid crystal molecules, and the voltage applied to the first electrode during the black display is decreased and the electric field is weakened or set to zero to reversely rotate the liquid crystal molecules.

In the liquid crystal display device of the present invention, the liquid crystal molecules preferably have positive anisotropy of dielectric constant.

In the liquid crystal display device of the present invention, preferably the lower substrate includes a thin-film transistor element, and the thin-film transistor element contains an oxide semiconductor.

The configuration of the liquid crystal display device of the present invention is not particularly limited by other components, but other configurations usually used for a liquid crystal display device can appropriately be applied.

Advantageous Effects of Invention

According to the liquid crystal display device of the present invention, a high contrast ratio and a wide viewing angle can be achieved and a high-speed response can be realized.

DESCRIPTION OF EMBODIMENTS

Figure 1:
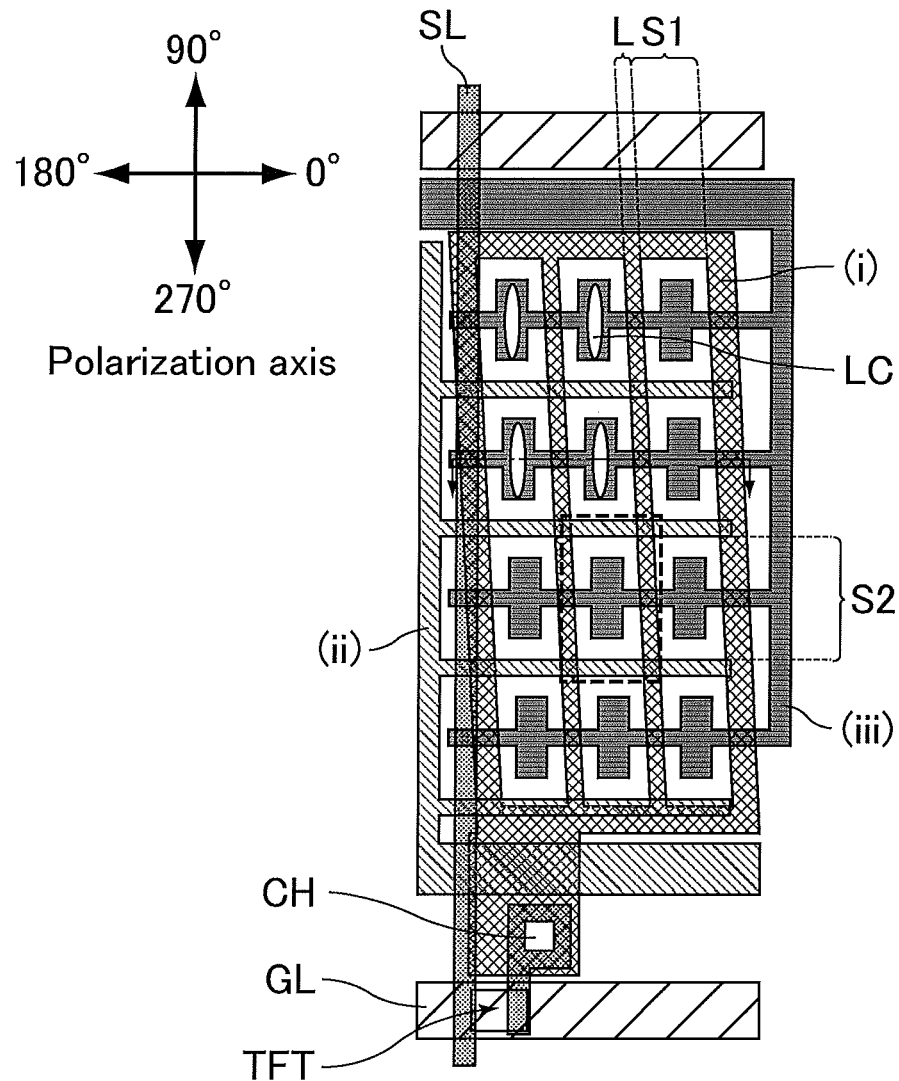
FIG. 1 is a schematic plan view showing an electrode structure of a pixel and initial alignment of liquid crystal molecules of a liquid crystal display device of Embodiment 1.

Embodiments of the present invention will be described in detail below with reference to the drawings, but the present invention is not limited to only these embodiments. In the present description, a pixel may be a sub-pixel unless otherwise stated. The sub-pixel means, for example, a region illustrating any monochromatic color such as R (red), G (green), B (blue) or yellow (Y). One pair of substrates between which the liquid crystal layer is sandwiched are also referred to as an upper substrate and a lower substrate. One of the substrates which is on a display surface side is referred to as an upper substrate, and the other of the substrates on an opposite side of the display surface is referred to as a lower substrate. Among electrodes arranged on the substrate, an electrode on the display surface side is referred to as an upper-layer electrode, and an electrode on the opposite side of the display surface side is referred to as a lower-layer electrode.

In each embodiment, a member or a portion that exhibits a similar function is denoted by the same reference numeral. In the drawings, unless otherwise stated, (i) indicates a slit electrode on an upper layer (liquid crystal layer side) of the lower substrate, (ii) indicates a comb-shaped electrode in a lower-layer (opposite side of the liquid crystal layer side) of the lower substrate, and (iii) indicates another comb-shaped electrode in the lower layer of the lower substrate. In the liquid crystal display device of the present invention, the comb-shaped electrode indicated by (iii) has a projection portion in which a part of the branch portion branched from the trunk portion is widened. (i) may be disposed on the lower layer (the side opposite to the liquid crystal layer side) of the lower substrate, and (ii) and (iii) may be disposed on the upper layer of the lower substrate, and the effects of the present invention can be exerted. As shown in each embodiment, it is preferred that (i) is an upper-layer electrode disposed on the upper layer of the lower substrate and (ii) and (iii) are lower-layer electrodes disposed on the lower layer of the lower substrate. Further, (iv) indicates the upper-layer electrode in an electrode layer having an FFS structure, and (v) indicates the lower-layer electrode in the electrode layer having the FFS structure. The layers, such as a color filter and a black matrix, which are not involved in electric field control of the liquid crystal are omitted. In the present description, the voltage refers to a potential difference from the ground potential.

In the present description, the electrode of the lower substrate means at least one of the upper-layer electrode (i), the lower-layer electrode (ii), and the lower-layer electrode (iii). Further, the phrase "when the lower substrate is viewed in a plan view" means a time when the main surface of the lower substrate is viewed in a plan view.

In the present description, the slit electrode means an electrode in which a slit is provided, and usually includes multiple linear portions as in the comb-shaped electrode. The slit is a region (opening) in which no electrode is formed. Note that, a portion between the linear portions in the comb-shaped electrode is also a region (opening) where no electrode is formed.

In the present description, the time of rising means a period during which a display state changes from a dark state (black display) to a bright state (white display). The time of falling means a period during which the display state changes from the bright state (white display) to the dark state (black display). The initial alignment of liquid crystal means alignment of liquid crystal molecules when no voltage is applied to the liquid crystal layer.

The upper-layer electrode (i), the lower-layer electrode (ii), and the lower-layer electrode (iii) can usually be set to different voltages equal to or higher than a threshold voltage. The phrase "can be set to the different voltages equal to or higher than the threshold voltage" means that any method capable of realizing a driving operation of setting the different voltages equal to or higher than the threshold voltage can be used, and thereby an electric field applied to the liquid crystal layer can preferably be controlled. In a configuration capable of setting the different voltages, for example, when the upper-layer electrode (i) is a pixel electrode while the lower-layer electrode (ii) and the lower-layer electrode (iii) are the common electrode, a TFT (thin-film transistor element) is connected to the upper-layer electrode (i), an alternating-current voltage (AC voltage) is applied to perform alternating-current drive (AC drive) of the liquid crystal by changing the voltage value, and the alternating-current voltage is applied to the lower-layer electrode (ii) and the lower-layer electrode (iii) to perform the AC drive of the liquid crystal with another TFT, the AC voltage is applied to the lower-layer electrode (ii) and the lower-layer electrode (iii), which are commonly connected in each line or all the pixels, with TFTs corresponding to the line or all the pixels to perform the AC drive of the liquid crystal, the AC drive may be performed on a line or all pixels with no use of the TFT, or a direct-current voltage (DC voltage) may be applied to the lower-layer electrode (ii) and the lower-layer electrode (iii) with no use of the TFT to perform direct-current drive (DC drive) of the liquid crystal.

Embodiment 1

FIG. 1 is a schematic plan view showing an electrode structure of a pixel and initial alignment of liquid crystal molecules of the liquid crystal display device of Embodiment 1.

The upper-layer electrode (i) includes multiple linear portions when the lower substrate is viewed in a plan view. The linear portions are substantially parallel to each other, and slits substantially parallel to each other are provided between the linear portions, respectively. In this way, one of the preferred embodiments of the present invention is that the upper-layer electrode (i) is provided with the slits (is a slit electrode). Note that, the upper-layer electrode (i) may be a comb-shaped electrode instead of the slit electrode. It is also one of the preferred embodiments of the present invention that the upper-layer electrode (i) has the comb shape.

Each of the lower-layer electrode (ii) and the lower-layer electrode (iii) is constructed with a trunk portion and a branch portion extending from the trunk portion when the lower substrate is viewed in a plan view. The branch portion is multiple linear portions substantially parallel to each other. In this way, the lower-layer electrode (ii) and the lower-layer electrode (iii) are each comb-shaped and form a pair of comb-shaped electrodes.

As described above, preferably each of the upper-layer electrode (i), the lower-layer electrode (ii), and the lower-layer electrode (iii) includes the linear portion.

The structures of the upper-layer electrode (i), the lower-layer electrode (ii) and the lower-layer electrode (iii) in FIG. 1 are merely an example. The present invention is not limited to this shape, but electrodes having various structures can be used.

The extending direction of each of the branch portion of the lower-layer electrode (ii) and the branch portion of the lower-layer electrode (iii) was set to a direction forming 87° with respect to the extending direction of the linear portion of the upper-layer electrode (i). In other words, the two comb-shaped electrodes of the lower substrate are arranged so that the extending direction of the linear portion, which is the branch portion thereof, crosses the extending direction of the linear portion of the upper-layer electrode (i) at an angle of 87° when the lower substrate is viewed in a plan view. The angle is preferably 20° or more and 90° or less, more preferably 30° or more, further preferably 45° or more, still more preferably 60° or more, particularly preferably 75° or more. With such an electrode structure, a response time can be shortened further at the time of rising and at the time of falling.

As illustrated in FIG. 1, the linear portion of the branch portion of the lower-layer electrode (ii) of the lower substrate is disposed between the linear portions of the branch portion of the lower-layer electrode (iii).

The electrodes (the upper-layer electrode (i), the lower-layer electrode (ii), and the lower-layer electrode (iii)) of respective layers are arranged in a positional relationship as shown in FIG. 1. The upper-layer electrode (i) is electrically connected with a drain electrode extending from the thin-film transistor element TFT through a contact hole CH. At the timing selected by a gate bus line GL, the voltage supplied from the source driver through the source bus line SL is applied to the upper-layer electrode (i) that drives the liquid crystal through the thin-film transistor element TFT.

In the upper-layer electrode (i), the electrode width L of the linear portion is 3 µm and the electrode interval S1 between the adjacent linear portions is 6 µm. The electrode width L is preferably, for example, 2 µm or more and 7 µm or less. In addition, the electrode interval S1 is preferably, for example, 2 µm or more and 14 µm or less. Preferably a ratio (L/S1) of the electrode width L and the electrode interval S1 ranges from 0.1 to 1.5. More preferably a lower limit of the ratio L/S1 is 0.2, and an upper limit is 1.0. The structures of the upper-layer electrode (i), the lower-layer electrode (ii), and the lower-layer electrode (iii) are shown in detail in FIGS. 3 to 5 described later.

In Embodiment 1, two linearly polarizing plates having the polarization axes shown in FIG. 1 are used. In Embodiment 1, one linearly polarizing plate is disposed on each of outsides (on the liquid crystal layer side and on the opposite side when viewed from each substrate) of the upper and lower substrates. The linearly polarizing plates are arranged in crossed Nicols in which the polarization axes of the linearly polarizing plates are perpendicular or parallel to a major axis (an initial alignment orientation of the liquid crystal molecules) of the liquid crystal molecules when the voltage is not applied in the upper and lower substrates, thereby forming a normally black mode liquid crystal display device. In this way, preferably each of the upper and lower substrates has the linearly polarizing plate.

Figure 2:
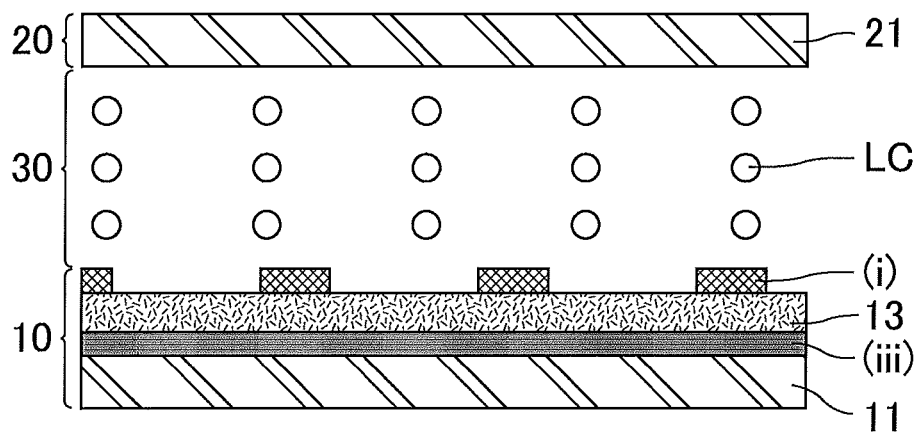
FIG. 2 is a schematic cross-sectional view showing a cross section of a portion corresponding to a line segment indicated by a one-dot chain line in FIG. 1.

FIG. 2 is a schematic cross-sectional view showing a cross section of a portion corresponding to a line segment indicated by a one-dot chain line in FIG. 1.

The liquid crystal display device of Embodiment 1 includes, as shown in FIG. 2, a lower substrate 10, a liquid crystal layer 30, and an upper substrate 20 stacked in this order from a back side of the liquid crystal display device toward an observation surface side.

As shown in FIG. 2, in the liquid crystal display device of Embodiment 1, when the potential difference between the electrodes of the upper and lower substrates is less than the threshold voltage, the liquid crystal molecules LC are horizontally aligned (aligned parallel to the main surface of the upper and lower substrates). In FIG. 2, the liquid crystal molecules LC are aligned so that the major axes of the liquid crystal molecules LC are directed toward the front from the back of the drawing.

The lower-layer electrode (ii) (not illustrated in FIG. 2) and the lower-layer electrode (iii) of the lower substrate 10 are the comb-shaped electrodes as described above, and the upper-layer electrode (i) that is the slit electrode is disposed above the lower-layer electrode (ii) and the lower-layer electrode (iii) with an insulating layer 13 interposed therebetween. A liquid crystal driving electrode is not provided on the upper substrate 20, but a liquid crystal driving electrode is provided only in the lower substrate 10. A liquid crystal driving electrode may be provided on the upper substrate 20.

The dielectric constant of the insulating layer 13 is 6.9, and the average thickness thereof is 0.3 µm. Each of the insulating layers 13 is composed of a nitride film SiN, but instead other inorganic films such as an oxide film $SiO_2$, an acrylic resin, or the like, or a combination of these materials can be also used.

A horizontal alignment film (not shown) is provided on each of the liquid crystal layer sides of the upper and lower substrates, and the liquid crystal molecules when the voltage is not applied are horizontally aligned so that the major axis of the liquid crystal molecules forms an angle of 3° with the extending direction of the linear portion of the upper-layer electrode (i). Note that the liquid crystal layer and the upper-layer electrode (i) are adjacent via the horizontal alignment film. The horizontal alignment film is not particularly limited as long as the horizontal alignment film allows the liquid crystal molecules to be aligned horizontally with respect to the film surface. Examples of the horizontal alignment film include an alignment film (for example, an alignment film having a dielectric constant ε=3 to 4) formed of an organic material, an alignment film (for example, an alignment film having a dielectric constant ε=5 to 7) formed of an inorganic material, a photo alignment film formed of an optically active material, and an alignment film subjected to alignment treatment by rubbing or the like. The alignment film may be an alignment film that is not subjected to alignment treatment by rubbing treatment or the like. Using an alignment film, which does not need to be subjected to alignment treatment by rubbing treatment or the like, such as an alignment film formed of an organic material, an alignment film formed of an inorganic material, and a photo alignment film, makes it possible to reduce the cost by simplifying the process and improve reliability and yield. When rubbing treatment is performed, liquid crystal contamination due to contamination of impurities from a rubbing cloth or the like, a point defect due to a foreign matter, display unevenness due to uneven rubbing in a liquid crystal panel, etc. may occur. However, these disadvantages can also be eliminated by using an alignment film which does not require alignment treatment by the rubbing treatment or the like.

The liquid crystal contains liquid crystal molecules that are aligned in a horizontal direction when the voltage is not applied. The term "aligned in the horizontal direction" means that in the technical field of the present invention, liquid crystal molecules are aligned in a substantially horizontal direction with respect to the main surface of the substrate (in other words, a direction substantially parallel to the main surface of the upper and lower substrates), and it is sufficient as long as it can exhibit an optical effect. Preferably the liquid crystal is substantially constructed with the liquid crystal molecules that are aligned in the horizontal direction when the voltage is not applied. The above "when the voltage is not applied" may be paraphrased as when the voltage is substantially not applied (for example, when the voltage is less than the threshold voltage) in the technical field of the present invention. Such a horizontal alignment type liquid crystal is an advantageous system for obtaining characteristics such as a wide viewing angle.

The liquid crystal material in the liquid crystal layer 30 in the liquid crystal display device of Embodiment 1 has positive anisotropy of dielectric constant (anisotropy of dielectric constant Δε=5.9, viscosity (rotational viscosity) γ1=89 cps, anisotropy of refractive index Δn=0.109, Re of panel=350 nm). As described above, in the liquid crystal display device of the present invention, the liquid crystal molecules preferably have positive anisotropy of dielectric constant. The liquid crystal molecules having positive anisotropy of dielectric constant are aligned in a certain direction when the electric field is applied. For the liquid crystal molecules having positive anisotropy of dielectric constant, the alignment control is easily performed, and higher-speed response can be achieved. Preferably anisotropy of dielectric constant Δε of the liquid crystal is greater than or equal to 2, more preferably is greater than or equal to 3, and still more preferably is greater than or equal to 4. Preferably the anisotropy of dielectric constant Δε of the liquid crystal is less than or equal to 30, more preferably is less than or equal to 20, and still more preferably is less than or equal to 10. In the present description, the anisotropy of dielectric constant Δε of the liquid crystal is measured by an LCR meter.

In Embodiment 1, the average thickness (cell gap) $d_{LC}$ of the liquid crystal layer 30 is 3.2 µm.

In the present description, the average thickness $d_{LC}$ of the liquid crystal layer means a value calculated by averaging the thickness of the entire liquid crystal layer in the liquid crystal display device.

Preferably $d_{LC} \times \Delta n$ is greater than or equal to 100 nm, more preferably is greater than or equal to 150 nm, and still more preferably is greater than or equal to 200 nm. Preferably $d_{LC} \times \Delta n$ is less than or equal to 550 nm, more preferably is less than or equal to 500 nm or less, and still more preferably is less than or equal to 450 nm.

In Embodiment 1, the lower substrate is a two-layer electrode. In this way, it is one of the preferred embodiments in the liquid crystal display device of the present invention that the electrode of the lower substrate is composed of the electrode provided with the slit of the upper layer and the pair of comb-shaped electrodes of the lower layer. However, for example, a pair of comb-shaped electrodes may be used instead of the slit electrode in the upper-layer electrode (i) of the lower substrate. In the case of using a pair of comb-shaped electrodes, liquid crystal molecules are rotated in a horizontal plane by generation of a lateral electric field between the pair of comb-shaped electrodes. In the case of using a pair of comb-shaped electrodes instead of the slit electrode, the extending direction of the branch portions of the pair of comb-shaped electrodes may be arranged in the same way as the extending direction of the linear portion of the slit electrode.

Figure 3:
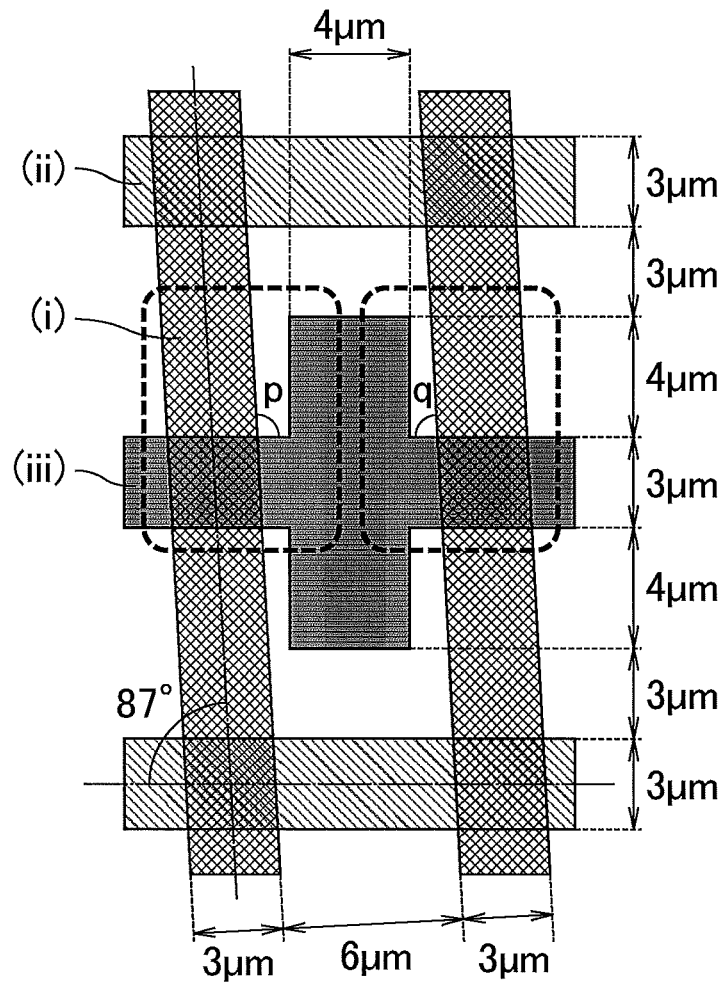
FIG. 3 is an enlarged view showing a portion surrounded by a broken line in FIG. 1.
Figure 4:
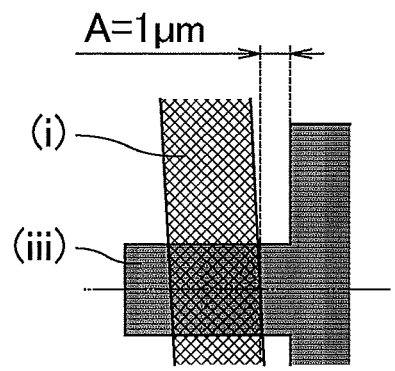
FIG. 4 is an enlarged view showing a portion surrounded by a broken line on the left side in FIG. 3.
Figure 5:
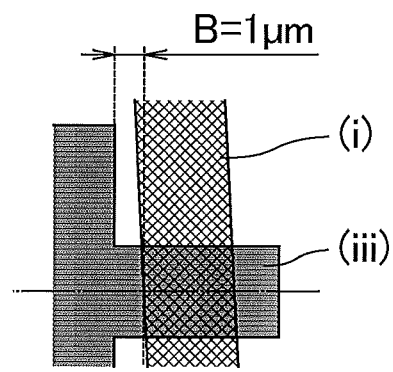
FIG. 5 is an enlarged view showing a portion surrounded by a broken line on the right side in FIG. 3.

FIG. 3 is an enlarged view showing a portion surrounded by a broken line in FIG. 1. FIG. 4 is an enlarged view showing a portion surrounded by a broken line on the left side in FIG. 3. FIG. 5 is an enlarged view showing a portion surrounded by a broken line on the right side in FIG. 3.

As shown in FIG. 3, at least one of multiple branch portions of the lower-layer electrode (iii) (preferably each of the branch portions of the lower-layer electrode (iii)) includes, when the lower substrate is viewed in a plan view, a narrow portion which is narrowest and a projection portion which is wider than the narrow portion.

In FIG. 3, when the lower substrate is viewed in a plan view so that one of the projection portions is directed to an upper side of upper, lower, left, and right sides, the projection portion is present in a portion (opening) where the electrode of the first electrode is not formed, among the left side and right side of the projection portion in the opening, the length of the narrow portion in the opening on the side where the angle on the upper side and on the opening side formed by the contour line of the opening and the narrow portion of the branch portion of the lower-layer electrode (iii) is an obtuse angle or a right angle is A, and the length of the narrow portion in the opening on the side where the angle on the upper side and on the opening side formed by the contour line of the opening and the narrow portion of the branch portion of the lower-layer electrode (iii) is an acute angle or a right angle is B, as shown in FIG. 4, A is 1 µm, and as shown in FIG. 5, B is 1 µm. According to one aspect of the present invention, A may be 0 µm or more and 1.5 µm or less. Further, according to one aspect of the present invention, B is 0 µm or more and −0.5 A+2 µm or less when A is 0 µm or more and 0.5 µm or less, is 0 µm or more and 0.5 A+1.5 µm or less when A is more than 0.5 µm and 1.0 µm or less, and may be 0 µm or more and −0.5 A+2.5 µm or less when A is more than 1.0 µm and 1.5 µm or less. These are derived from the graph shown in FIG. 45 to be described later.

In addition, among the branch portions of the lower-layer electrode (ii) and the lower-layer electrode (iii), the width of the narrow portion which is narrowest (excluding the portion where the projection portion is formed) is 3 µm, and a widened width (height of the projection portion) of the projection portion (the projection portion refers to a portion formed by an amount corresponding to the width becoming wider than the narrow portion) which becomes wider than the narrow portion is 4 µm. The widened width (height) of the projection portion is preferably 3.2 µm or more, more preferably 3.5 µm or more. The widened width (height) of the projection portion is preferably 6 µm or less, more preferably 5 µm or less. That is, in the branch portions of the pair of comb-shaped electrodes constituted by the lower-layer electrode (ii) and the lower-layer electrode (iii), the width of the narrow portion which is narrowest is 3 µm, and an electrode interval between the linear portion in the lower-layer electrode (ii) and the narrow portion which is narrowest in the lower-layer electrode (iii) is 7 µm. The width of the narrow portion is preferably 2 µm or more and 7 µm or less. In addition, the electrode interval is preferably 2 µm or more, and preferably 15 µm or less. The length (ratio) of the electrode width to the electrode interval is preferably 0.1 to 5.

The branch portion of the lower-layer electrode (iii) has a projection portion wider than the narrow portion. The projection portion has a quadrilateral shape (quadrilateral shape), protruding from both sides of the branch portion of the lower-layer electrode (iii), and as a result, the branch portion of the lower-layer electrode (iii) has a cross shape. The length of the projection portion (the length in the extending direction of the branch portion) is 4 µm. The distance between the tip of the projection portion and the lower-layer electrode (ii) is 3 µm.

Other lengths such as the electrode interval are values as shown in FIG. 3. Note that S2 shown in FIG. 1 is 17 µm. In addition, each of the electrode widths and the electrode intervals described above may be generally the same in the pixels, or may be different in the pixels, but it is more preferred that they are substantially the same in the pixels.

A liquid crystal driving method using the liquid crystal display device of the present embodiment will be described below.

In the present embodiment, drive capable of high-speed response can be realized. By switching a voltage application method, two kinds of drive of the drive capable of high-speed response and drive achieving higher transmittance than that of the drive capable of high-speed response can be realized with the same configuration.

In the present description, the drive capable of realizing high-speed response is referred to as the first driving system, and the drive that achieves the higher transmittance is referred to as the second driving system.

Both the first driving system and the second driving system change the voltage of the upper-layer electrode (i) to perform the gray-scale display.

In the first driving system, the lower-layer electrode (ii) and the lower-layer electrode (iii) always generate a lateral electric field by applying voltages while inverting their polarities with the amplitude center set to 0 V so that their polarities are opposite to each other, and the voltage corresponding to the gray scale is applied to the upper-layer electrode (i) with polarity reversal to drive the liquid crystal display device.

In the second driving system, both the lower-layer electrode (ii) and the lower-layer electrode (iii) are set to 0 V, and the voltage corresponding to the gray scale is applied to the upper-layer electrode (i) to generate a fringe electric field between the upper-layer electrode (i) and the lower-layer electrode (ii) and the lower-layer electrode (iii), thereby driving the liquid crystal display device.

The liquid crystal display device is preferably configured so that the temperature is detected with a temperature sensor and the first driving system and the second driving system can be switched according to the temperature range.

Behavior of liquid crystal molecules at the time of rising and at the time of falling, which is one of features of the present invention, will be described.

Figure 6:
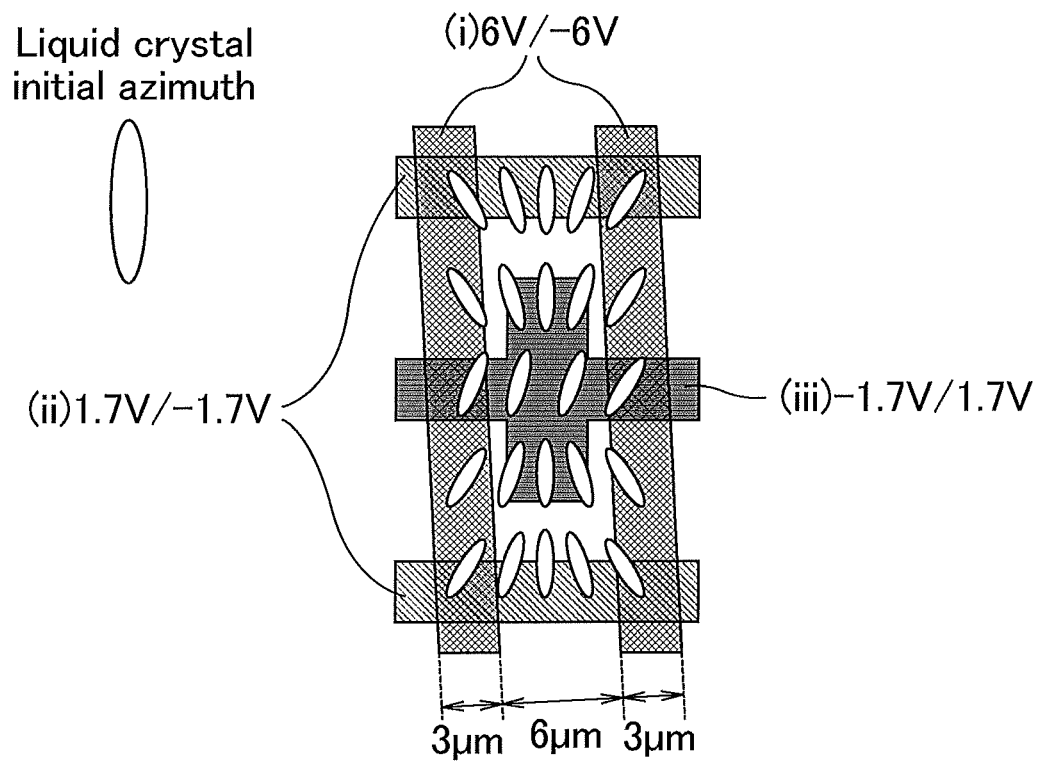
FIG. 6 is a schematic plan view showing a voltage applied to each electrode and alignment of liquid crystal molecules during white display of a first driving system of Embodiment 1.
Figure 7:
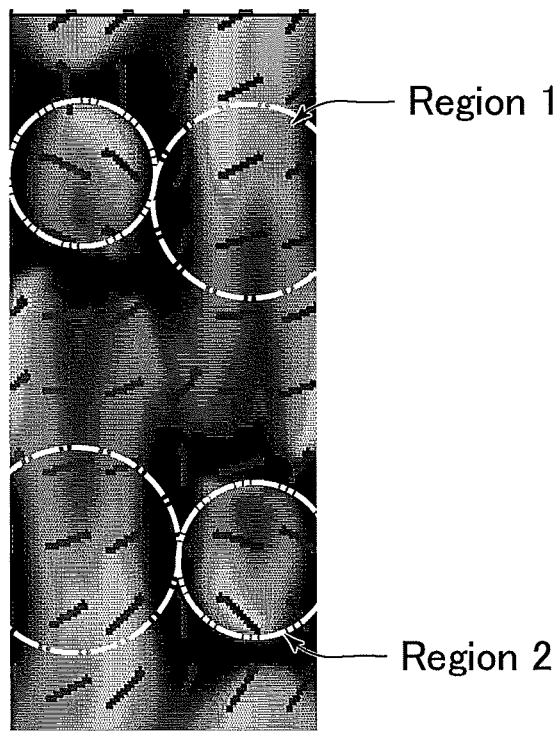
FIG. 7 is a simulation result showing a director distribution and a transmittance distribution corresponding to FIG. 6.
Figure 8:
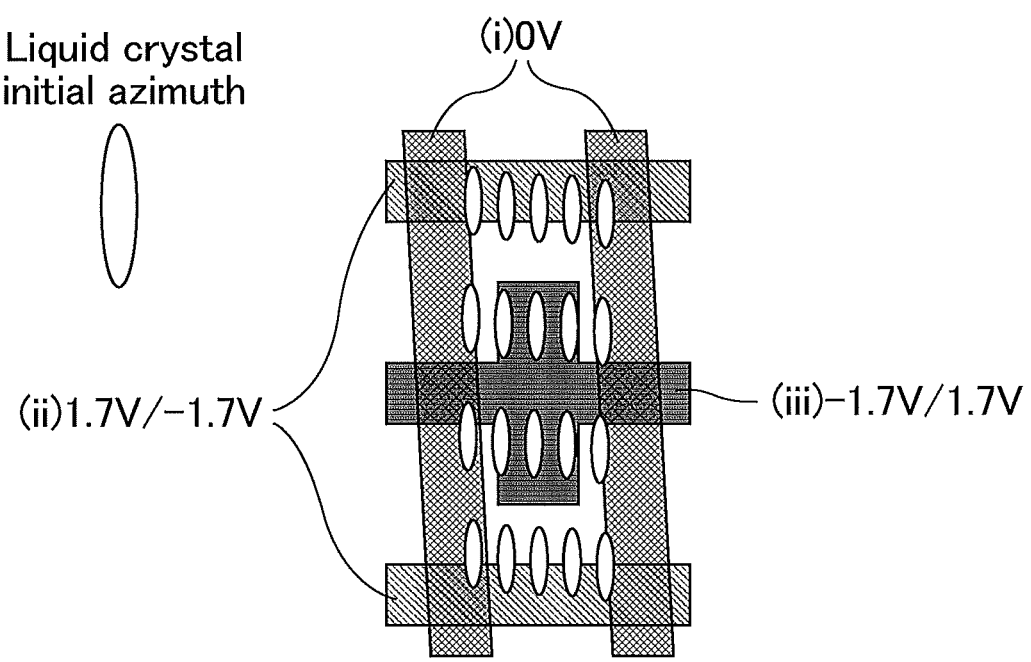
FIG. 8 is a schematic plan view showing a voltage applied to each electrode and alignment of liquid crystal molecules during black display of the first driving system of Embodiment 1.
Figure 9:
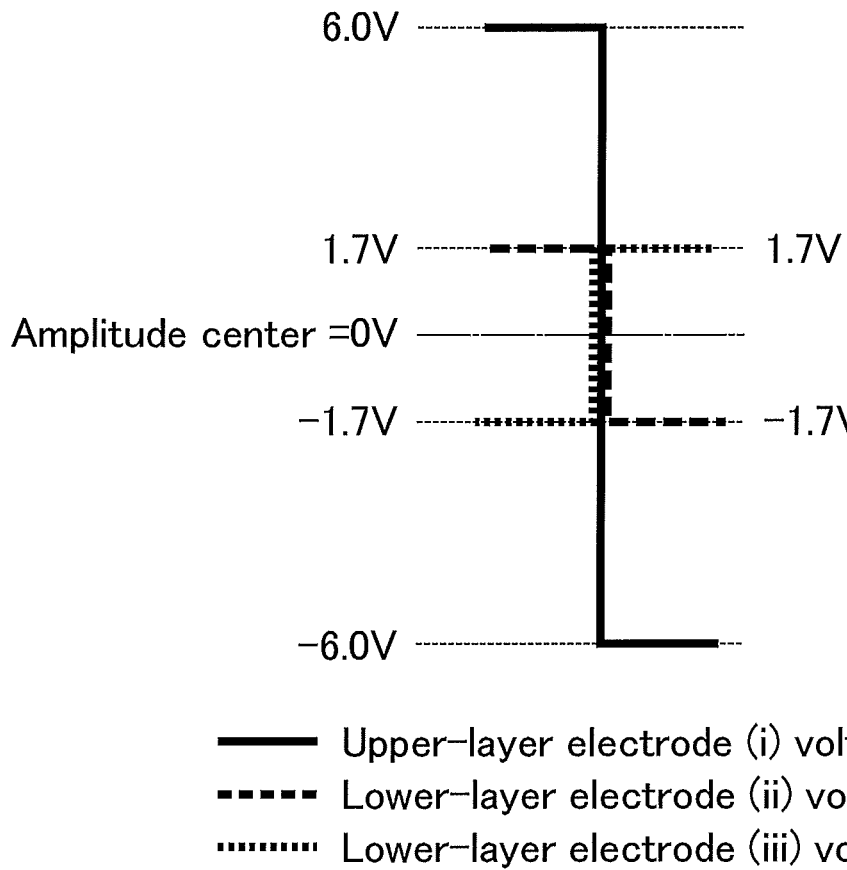
FIG. 9 is a voltage relationship diagram showing a voltage applied to each electrode during white display of the first driving system of Embodiment 1.

FIG. 6 is a schematic plan view showing a voltage applied to each electrode and alignment of the liquid crystal molecules during white display of the first driving system of Embodiment 1. FIG. 7 is a simulation result showing a director distribution and a transmittance distribution corresponding to FIG. 6. FIG. 8 is a schematic plan view showing a voltage applied to each electrode and alignment of the liquid crystal molecules during black display of the first driving system of Embodiment 1. FIG. 9 is a voltage relationship diagram showing a voltage applied to each electrode during white display of the first driving system of Embodiment 1. FIGS. 6 to 8 show the voltage application method and the behavior of liquid crystal molecules in the first driving system of the present invention, respectively, and show the electrode structure in a region corresponding to the region surrounded by the broken line in FIG. 1 and an alignment state of the liquid crystal molecules.

First, the behavior of the liquid crystal molecules at the time of rising of the first driving system will be described in detail.

As shown in FIGS. 6 and 9, the lower-layer electrode (ii) and the lower-layer electrode (iii) always generate the lateral electric field by always applying voltages while inverting their polarities with the amplitude center set to 0 V so that their polarities are opposite to each other. Note that, an absolute value of the voltage applied to each of the lower-layer electrode (ii) and the lower-layer electrode (iii) is always constant. Then, the voltage is applied to the upper-layer electrode (i) with the polarity inversion, thereby an electric field that alternately rotates the liquid crystal molecules in different orientations in a horizontal plane is generated, and the liquid crystal molecules are aligned in the horizontal plane by the electric field so as to form bend alignment and splay alignment. In the first driving system of the present embodiment, 6 V/−6 V is applied to the upper-layer electrode (i), 1.7 V/−1.7 V is applied to the lower-layer electrode (ii), and −1.7 V/1.7 V is applied to the lower-layer electrode (iii) during white gray-scale display. In the liquid crystal display device of Embodiment 1, the stability of alignment of liquid crystal molecules can be maintained even if the voltage applied to the lower-layer electrode (ii) and the lower-layer electrode (iii) is reduced for the reason described later, and thus the voltage applied to the lower-layer electrode (ii) and the lower-layer electrode (iii) can be reduced in order to reduce the black floating. From the viewpoint of reducing black floating, for example, it is preferred to set the absolute value of the voltage applied to each of the lower-layer electrode (ii) and the lower-layer electrode (iii) to 2 V or less.

The potential difference between the upper-layer electrode (i) and the lower-layer electrode (ii) during white gray-scale display is 4.3 V, but is, for example, preferably 8 V or less, more preferably 7 V or less, still more preferably 6 V or less. The potential difference is preferably 1 V or more, more preferably 2 V or more, and still more preferably 4 V or more.

The potential difference between the upper-layer electrode (i) and the lower-layer electrode (iii) during white gray-scale display is 7.7 V, but preferably 2 to 12 V, more preferably 3 to 11 V, still more preferably 4 to 10 V.

As can be seen from the transmittance distribution diagram by simulation (FIG. 7), the liquid crystal molecules rotate in different orientations in the region 1 (the first region) surrounded by a one-dot chain line and the region 2 (the second region) surrounded by a two-dot chain line, and it turns out that the region 1 and the region 2 exist alternately. That is, in the first driving system, the liquid crystal molecules rotate alternately in different orientations in the horizontal plane. In the region 1 shown in FIG. 7, the liquid crystal molecules rotate in the clockwise direction in the horizontal plane, and in the region 2, the liquid crystal molecules rotate counterclockwise in the horizontal plane. As a result, bend alignment and splay alignment of the liquid crystal molecules occur in the horizontal plane.

Further, since the voltage is always applied to the lower-layer electrode (ii) and the lower-layer electrode (iii) so that a lateral electric field is generated between the lower-layer electrode (ii) and the lower-layer electrode (iii), in the rise response, a strong electric field is applied to the entire region in the horizontal plane. Consequently, the speed of the rise response is enhanced.

Next, the behavior of liquid crystal molecules at the time of falling of the first driving system will be described.

As shown in FIG. 8, by weakening the voltage applied to the upper-layer electrode (i), the liquid crystal molecules react with the lateral electric field generated by the lower-layer electrode (ii) and the lower-layer electrode (iii), and rotate forcibly to the initial alignment orientation by the electric field. At the same time, restoring force of the liquid crystal molecules that have been bend alignment and splay alignment in the horizontal plane during the white display also acts to further accelerate the response. In the first driving system of the present embodiment, during black gray-scale display, the upper-layer electrode (i) is 0 V, the lower-layer electrode (ii) is applied with 1.7 V/−1.7 V, and the lower-layer electrode (iii) is applied with −1.7 V/1.7 V.

Since the voltage (1.7 V/−1.7 V, −1.7 V/1.7 V in FIG. 8) is always applied to the lower-layer electrode (ii) and the lower-layer electrode (iii) also in the decay response in the first driving system, when the voltage of the upper-layer electrode (i) is weakened or reduced to zero, the liquid crystal molecules are forcibly rotated in a direction returning to the initial alignment by the electric field generated between the lower-layer electrode (ii) and the lower-layer electrode (iii). Furthermore, in the case of the first driving system, bend alignment and splay alignment occur in the horizontal plane, and a large restoring force also works due to elastic strain induced thereby. Therefore, the speed of the decay response is also enhanced.

As described above, in FIG. 8, the potential of the upper-layer electrode (i) is set to 0 V. Except that the voltage of the pixel electrode (the upper-layer electrode (i) in Embodiment 1) is weakened or reduced to zero from the voltage at the time of maximum transmittance in this way, the potentials or the like of other electrodes (the lower-layer electrode (ii), the lower-layer electrode (iii) in Embodiment 1) can be the same as those during the white display of the first driving system, and the preferred range and the like are similar to those during the white display of the first driving system. For example, in Embodiment 1, 1.7 V/−1.7 V is applied to the lower-layer electrode (ii) of the lower substrate and −1.7 V/1.7 V is applied to the lower-layer electrode (iii) during both the white display and the black display. As described above, in the liquid crystal display device of the present invention, it is preferred that the lower-layer electrode (ii) and the lower-layer electrode (iii) of the lower substrate have absolute values of constant voltages during both the white display and the black display.

As a voltage application method to each electrode in the above-described first driving system, the upper-layer electrode (i) is a pixel electrode, the voltage applied to the upper-layer electrode (i) is changed, a voltage of a certain magnitude is applied to the lower-layer electrode (ii) and the lower-layer electrode (iii), and such a voltage application method is one of preferred embodiments of the liquid crystal display device of the present invention. However, as long as the operation and effect of the present invention are exerted, the upper and lower disposition relationship of each electrode may be appropriately changed. In addition, as long as a potential difference is generated between the lower-layer electrode (ii) and the lower-layer electrode (iii) and a lateral electric field is generated, a voltage may not be applied to both the lower-layer electrode (ii) and the lower-layer electrode (iii) as described above, and it is only necessary that a voltage is applied to at least one of the lower-layer electrode (ii) and the lower-layer electrode (iii).

Figure 10:
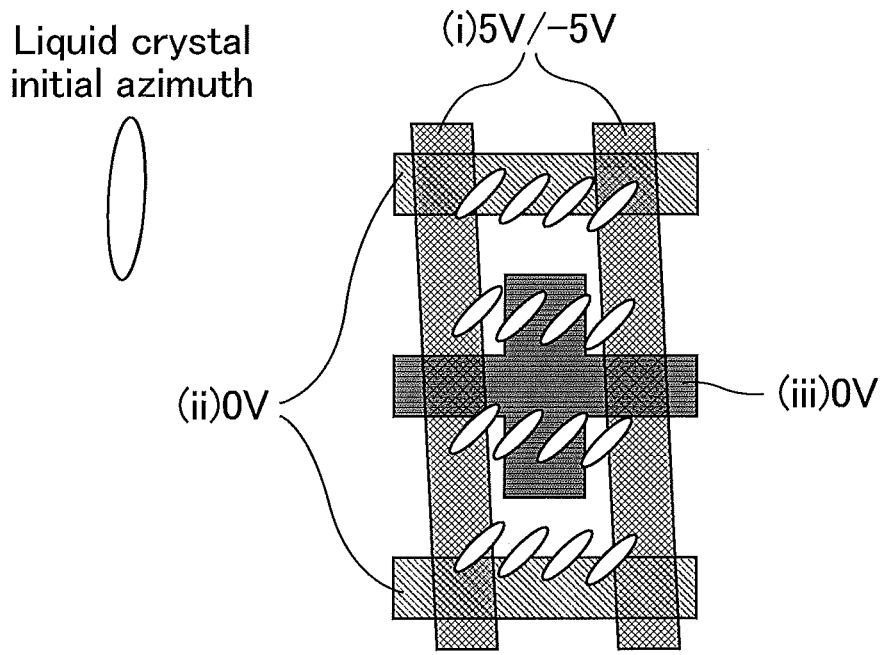
FIG. 10 is a schematic plan view showing a voltage applied to each electrode and alignment of liquid crystal molecules during white display of a second driving system of Embodiment 1.
Figure 11:
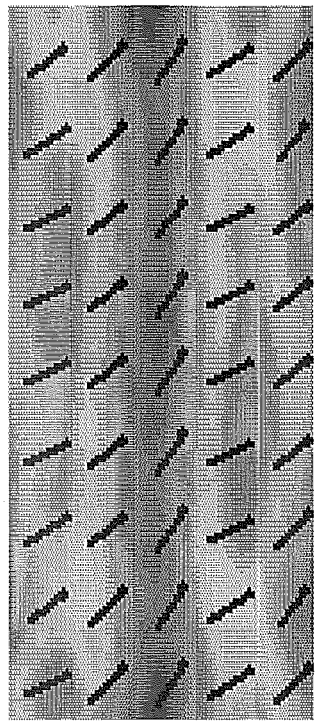
FIG. 11 is a simulation result showing a director distribution and a transmittance distribution corresponding to FIG. 10.
Figure 12:
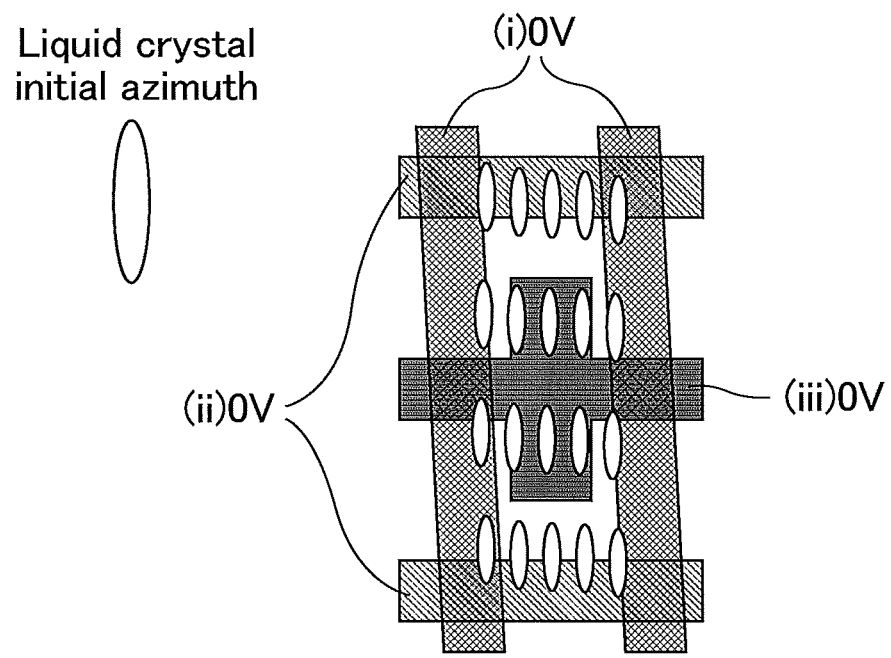
FIG. 12 is a schematic plan view showing a voltage applied to each electrode and alignment of liquid crystal molecules during black display of the second driving system of Embodiment 1.

FIG. 10 is a schematic plan view showing a voltage applied to each electrode and alignment of the liquid crystal molecules during the white display of the second driving system of Embodiment 1. FIG. 11 is a simulation result showing a director distribution and a transmittance distribution corresponding to FIG. 10. FIG. 12 is a schematic plan view showing a voltage applied to each electrode and alignment of the liquid crystal molecules during the black display of the second driving system of Embodiment 1.

FIGS. 10 to 12 each show a portion corresponding to a portion surrounded by a broken line in FIG. 1.

First, the behavior of the liquid crystal molecules at the time of rising of the second driving system will be described in detail.

As shown in FIG. 10, both the lower-layer electrode (ii) and the lower-layer electrode (iii) are set to 0V, then a voltage is applied to the upper-layer electrode (i) with the polarity inversion to generate a fringe electric field between the upper-layer electrode (i) and the lower-layer electrode (ii) and the lower-layer electrode (iii), and the liquid crystal molecules rotate in the same orientation in response to the fringe electric field. In the second driving system of the present embodiment, 5 V/−5 V is applied to the upper-layer electrode (i) during white gray-scale display.

As can be seen from the transmittance distribution diagram by simulation (FIG. 11), as the liquid crystal molecules rotate in the same orientation, the transmittance higher than that of the first driving system is obtained as a whole.

During the white display of the second driving system, a voltage at the upper-layer electrode (i) varies depending on the display. The voltage at the upper-layer electrode (i) is preferably 10 V or less, more preferably 8 V or less, still more preferably 7 V or less.

As described above, when the lower substrate is viewed in a plan view so that one of the projection portions is directed to an upper side of upper, lower, left, and right sides, among the left side and right side of the projection portion, the length A of the narrow portion in the opening on the side where the angle on the upper side and on the opening side formed by the contour line of the opening and the narrow portion of the branch portion of the lower-layer electrode (iii) is an obtuse angle or a right angle, and the length B of the narrow portion in the opening on the side where the angle on the upper side and on the opening side formed by the contour line of the opening and the narrow portion of the branch portion of the lower-layer electrode (iii) is an acute angle or a right angle are specified, and thereby the alignment of the liquid crystals can be more stabilized and the transmittance can be further improved during the white display of the second driving system, particularly when switching is made from low gray-scale display to high gray-scale display.

Next, the behavior of liquid crystal molecules at the time of falling of the second driving system will be described.

As shown in FIG. 12, when the voltage applied to the upper-layer electrode (i) is turned off, the liquid crystal molecules rotate so as to return toward an alignment treatment orientation (anchoring) by the restoring force of the liquid crystal molecules. In the second driving system of the present embodiment, the upper-layer electrode (i) is set to 0 V during black display. The voltage applied to each of the other electrodes (the lower-layer electrode (ii), the lower-layer electrode (iii)) is, as in the white display of the second drive system, set to 0 V. Note that, during black display of the second driving system, the voltage applied to the upper-layer electrode (i), the lower-layer electrode (ii) and the lower-layer electrode (iii) may be less than the threshold voltage.

<Comparison of Transmittances of the First Driving System and the Second Driving System of Example 1 Corresponding to Embodiment 1>

LCD Master 3D was used to calculate the voltage-transmittance (V-T) characteristics of the first driving system and the second driving system of Example 1 corresponding to Embodiment 1, and thus the presence or absence of an effect on increasing the transmittance by switching from the first driving system to the second driving system was verified. Table 1 below shows the transmittance during white display of the first driving system and the second driving system of Example 1. It has been found out that the transmittance of the second driving system (transmittance of 35.3%) was higher than that of the first driving system (maximum transmittance of 20.9%), and the transmittance was improved by switching from the first driving system to the second driving system.

TABLE 1

| | Transmittance (%) | |
|---|---|---|
| | First driving system | Second driving system |
| Example 1 | 20.9 | 35.3 |

Figure 13:
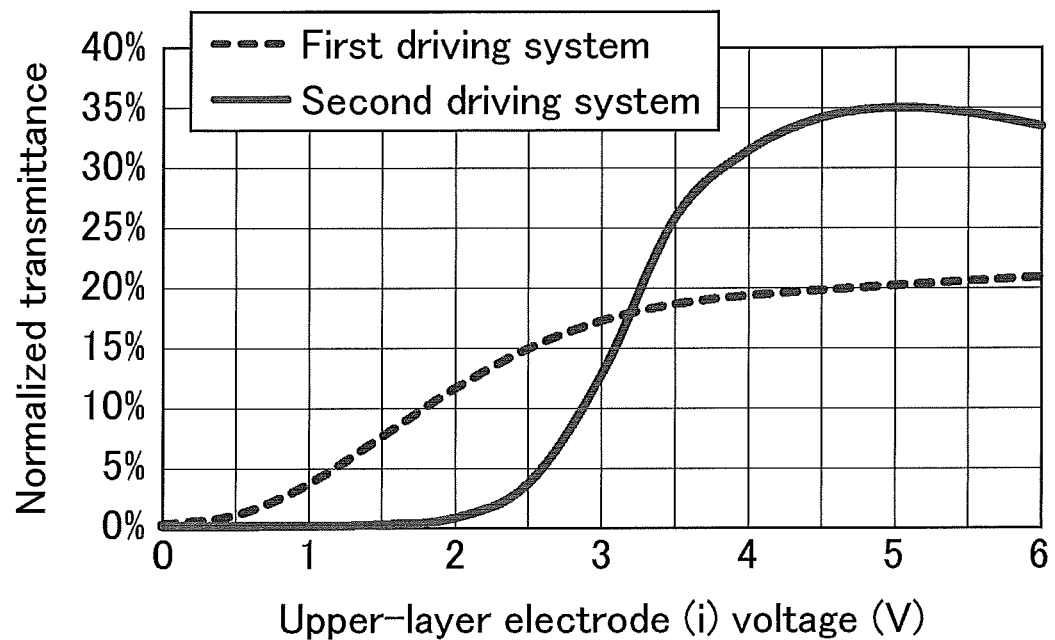
FIG. 13 is a graph showing voltage-normalized transmittance (V-T) characteristics of an upper-layer electrode (i) of each of the first driving system and the second driving system of Example 1.

FIG. 13 is a graph showing voltage-normalized transmittance (V-T) characteristics of the upper-layer electrode (i) of the first driving system and the second driving system of Example 1. Also from this Figure, the relationship of the transmittance between the first driving system and the second driving system can be understood.

<Comparison of Response Characteristics and Transmittance Between Example 1 and Comparative Example 1>

Response time and transmittance of Example 1 and Comparative Example 1 were calculated using LCD Master 3D to compare response characteristics and transmittance of Example 1 and Comparative Example 1. Note that, the configuration of Comparative Example 1 is the same as that of Comparative Embodiment 1 (configuration of a liquid crystal display device having a conventional FFS mode electrode structure) described below. The physical property of the liquid crystal was the value at room temperature. Table 2 shows the response time and transmittance of Example 1 and Comparative Example 1.

The item of Tr+Td describes the value of Tr+Td when the response time (ms) at which the transmittance changes from 10% to 90% is Tr and the response time (ms) at which the transmittance changes from 90% to 10% is Td. In addition, Tr+Td (ms)/transmittance (%) was calculated as an index for checking the compatibility between high speed response and high transmittance. The smaller this value, the better both high speed response and high transmittance can be achieved.

TABLE 2

| | Tr + Td (ms) *1 | Transmittance (%) *2 | Tr + Td (ms)/ Transmittance (%) |
|---|---|---|---|
| Example 1 | 15.8 | 35.3 | 0.447 |
| Comparative Example 1 | 29.8 | 34.5 | 0.864 |

*1 The response time of Example 1 is a value in the first driving system.
*2 The transmittance of Example 1 is a value in the second driving system.

As shown in Table 2, since the response time/transmittance of Example 1 is smaller than that of Comparative Example 1, it can be the that Example 1 is superior to Comparative Example 1 as a drive capable of achieving both high-speed response and high transmittance at the same time.

Figure 14:
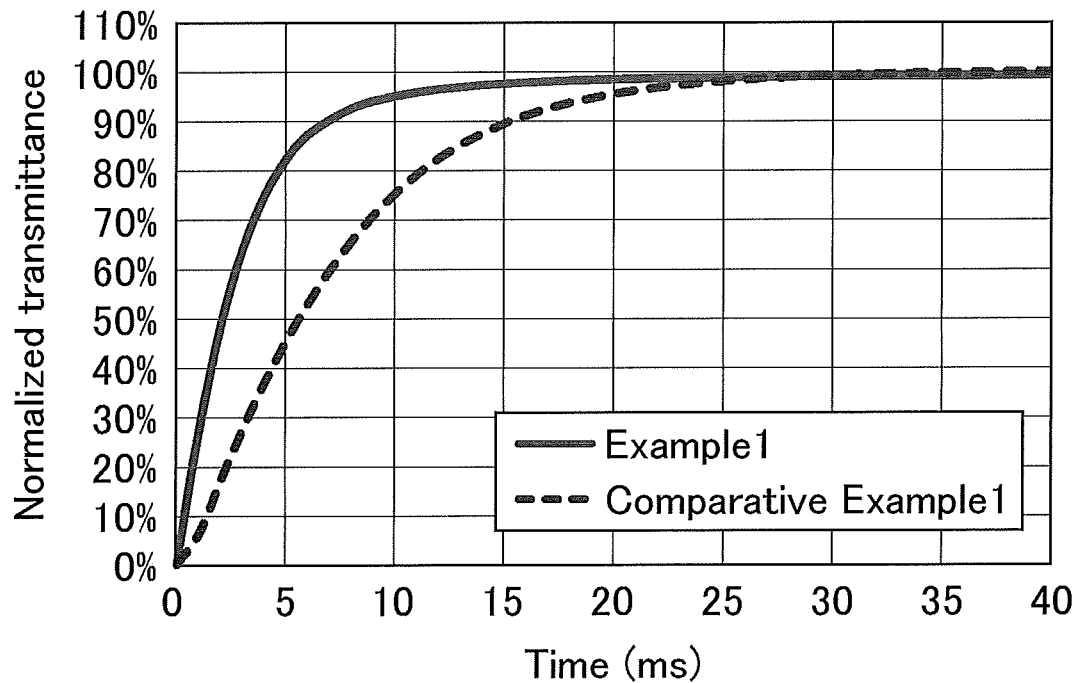
FIG. 14 is a graph showing normalized transmittance versus time at the time of rising in Example 1 and Comparative Example 1.
Figure 15:
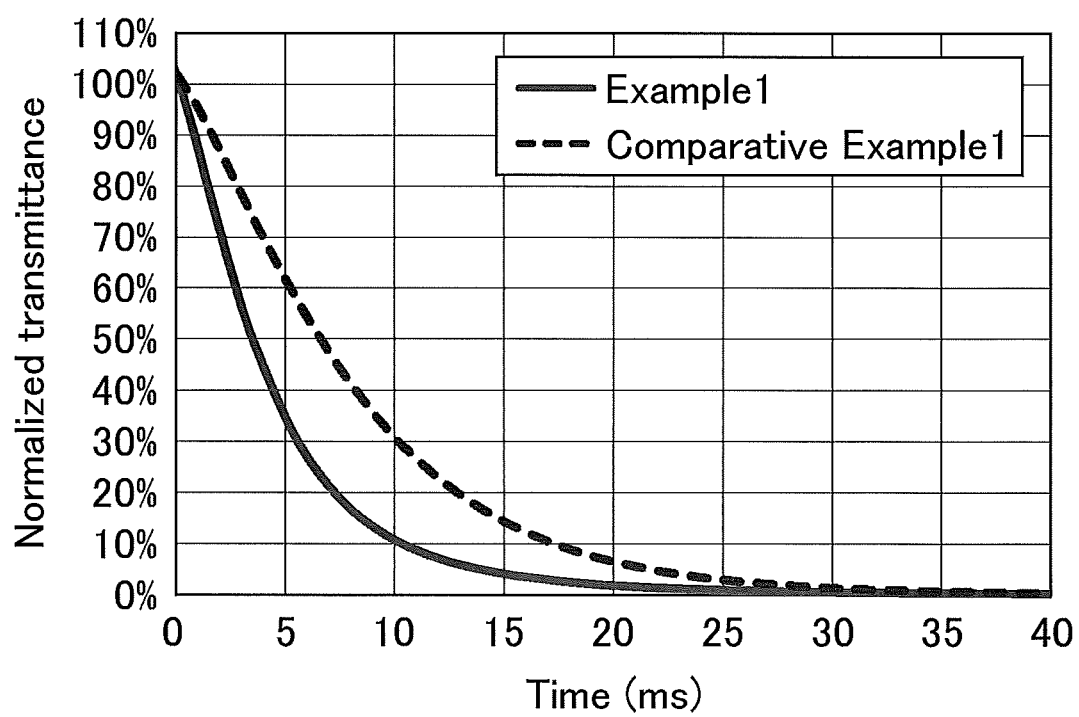
FIG. 15 is a graph showing normalized transmittance versus time at the time of falling in Example 1 and Comparative Example 1.

FIG. 14 is a graph showing normalized transmittance versus time at the time of rising of Example 1 and Comparative Example 1. FIG. 15 is a graph showing normalized transmittance versus time at the time of falling of Example 1 and Comparative Example 1. FIG. 14 and FIG. 15 show the results of response simulation of Example 1 and Comparative Example 1. It can be seen that Example 1 was faster than Comparative Example 1 in both the rise response and the decay response.

Therefore, in the first driving system of Example 1, the electric field that alternately rotates the liquid crystal molecules in different orientations in the horizontal plane can be formed, the speed enhancement can be achieved at both the time of rising and time of falling, and both the wide viewing angle and the high-speed response can be achieved. In the second driving system of Example 1, similarly to the FFS mode, the electric field that rotates the liquid crystal molecules in the same orientation over the entire region, and both the wide viewing angle and the high transmittance can be achieved.

Figure 16:
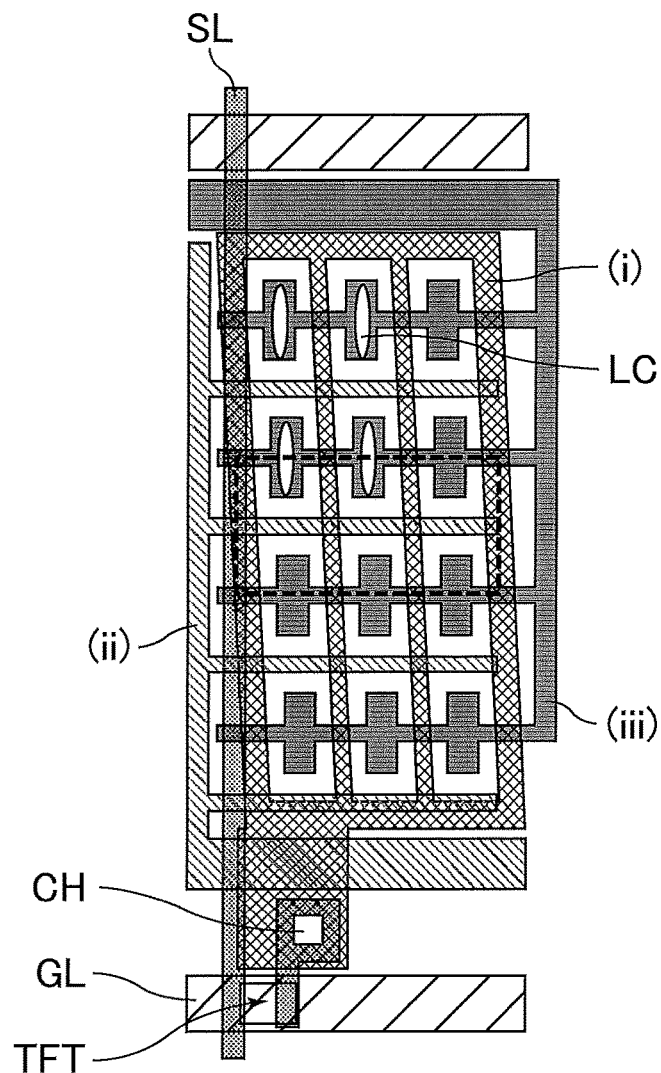
FIG. 16 is a schematic plan view showing an electrode shape and a conductive line of each pixel of the liquid crystal display device of Example 1.

FIG. 16 is a schematic plan view showing the electrode shape and a conductive line of each pixel of the liquid crystal display device of Example 1. FIG. 16 is one example, and the electrode shape, the conductive line, and the like are not limited to the shapes in FIG. 16.

In Example 1, since the voltages to be applied to the lower-layer electrode (ii) and the lower-layer electrode (iii) are different between the first driving system and the second driving system, for example, scanning is performed for each line (such as, gate bus line).

Figure 17:
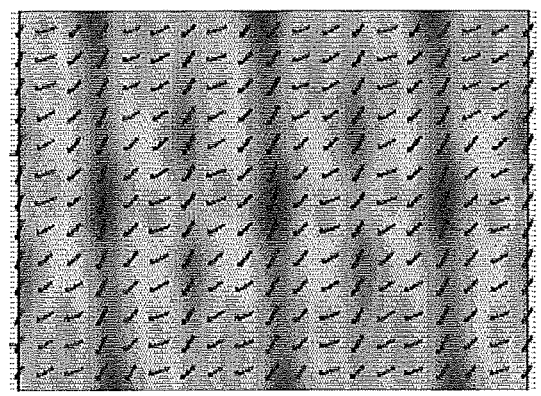
FIG. 17 is a simulation result showing alignment of liquid crystal molecules when switching is made from the black display (applied voltage 0 V to the upper-layer electrode (i)) to the white display (applied voltage 5 V to the upper-layer electrode (i)) in the second driving system of Example 1 in the region surrounded by the broken line in FIG. 16.

FIG. 17 is a simulation result showing the alignment of liquid crystal molecules when switching is made from the black display (the applied voltage 0 V to the upper-layer electrode (i)) to the white display (the applied voltage 5 V to the upper-layer electrode (i)) in the second driving system in Example 1 in the region surrounded by the broken line in FIG. 16.

Figure 38:
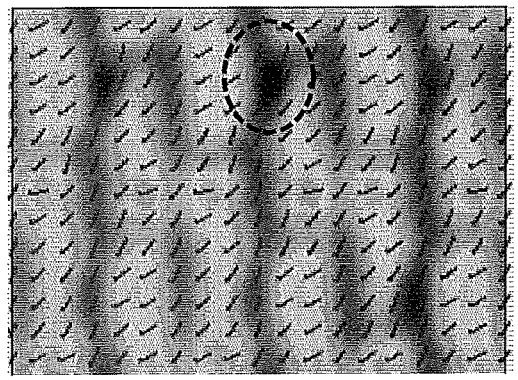
FIG. 38 is a simulation result showing alignment and transmittance distribution of liquid crystal molecules of Comparative Example 2.
Figure 39:
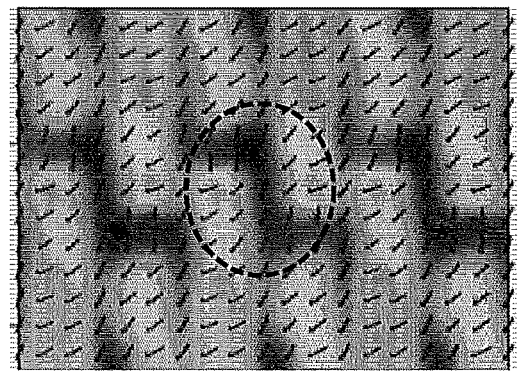
FIG. 39 is a simulation result showing alignment and transmittance distribution of liquid crystal molecules of Comparative Example 3.
Figure 40:
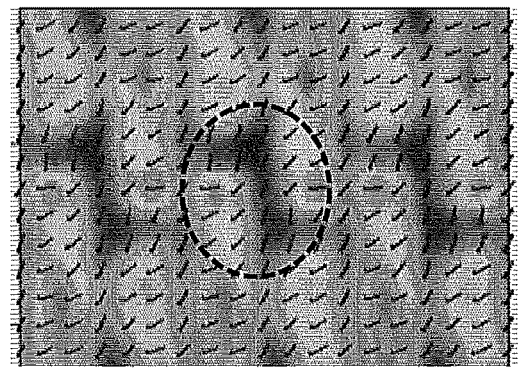
FIG. 40 is a simulation result showing alignment and transmittance distribution of liquid crystal molecules of Comparative Example 4.
Figure 41:
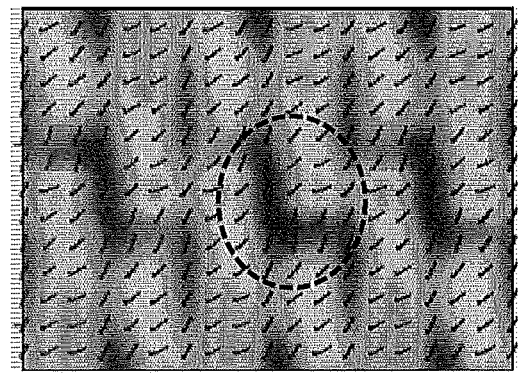
FIG. 41 is a simulation result showing alignment and transmittance distribution of liquid crystal molecules of Comparative Example 5.
Figure 42:
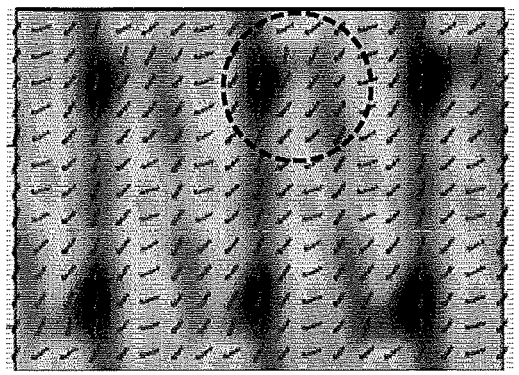
FIG. 42 is a simulation result showing alignment and transmittance distribution of liquid crystal molecules of Comparative Example 6.
Figure 43:
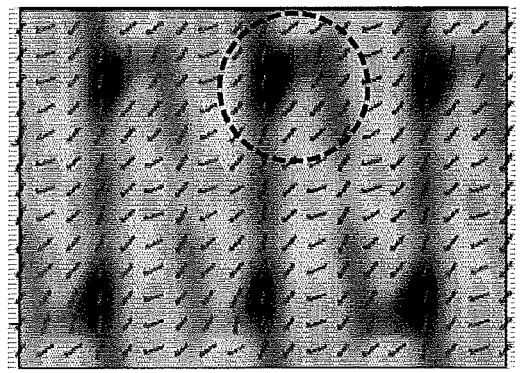
FIG. 43 is a simulation result showing alignment and transmittance distribution of liquid crystal molecules of Comparative Example 7.
Figure 44:
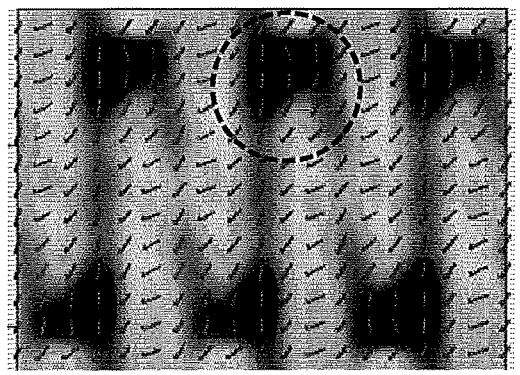
FIG. 44 is a simulation result showing alignment and transmittance distribution of liquid crystal molecules of Comparative Example 8.

FIG. 17 and FIG. 38 to be described later show the alignment state when the applied voltage to the upper-layer electrode (i) is changed from 0 V to 5 V, with the second driving system of Example 1 and Comparative Example 2 (the configuration of Comparative Example 2 is the same as that of Comparative Embodiment 2 described later. The configuration of Comparative Embodiment 2 is the same as that of Embodiment 1 except that the first condition is not satisfied), and the transmittance at that time (when 5 V is applied), respectively. In the alignment diagram of FIG. 17 and the like, a region surrounded by a dotted line as shown in FIG. 16 is expressed by a calculation model.

In the second driving system, the liquid crystal molecules rotate in the same direction in the entire region, whereas in Comparative Example 2, the rotation of the liquid crystal molecules is reduced in some regions, such as the region surrounded by the broken line in FIG. 38, and a region in which the alignment is destabilized is generated, and the transmittance decreases compared with that in Example 1.

The alignment stability of the second driving system was evaluated by calculating the index of the SN ratio from the angle of the liquid crystal molecules. The method of calculating the SN ratio is shown below.

Assuming that the interface between the alignment film of the lower substrate and the liquid crystal layer is $Z=0$ μm, and assuming that the rotation angle of liquid crystal molecules on the XY plane at $Z=0.96$ μm is Φ and the number of extraction is n, total sum of squares of rotation angle Φ is Sn $Sn=\Phi_1^2+\Phi_2^2+\ldots+\Phi_n^2$ average effect of rotation angle Φ is Sm $Sm=(\Phi_1+\Phi_2+\ldots+\Phi_n)^2/n$ error variation is Se $Se=Sn-Sm$ error dispersion is Ve $Ve=Se/(n-1)$ then,
SN ratio (dB)=10 log ((Sm−Ve)/Ve/n). As can be seen from the formula, the larger the SN ratio is, the smaller the variation in the rotation angle of the liquid crystal, that is, the higher the alignment stability is.

The SN ratios of the second driving system of Example 1 and Comparative Example 2 when 5 V is applied (during white display) are shown in Table 3 below.

TABLE 3

|  | SN ratio (dB) |
| --- | --- |
| Example 1 | 9.49 |
| Comparative Example 2 | 7.96 |

From the above formula, it is found that the alignment is more stable when the value of the SN ratio is larger, and that the alignment is more stable in Example 1 than in Comparative Example 2.

Figure 18:
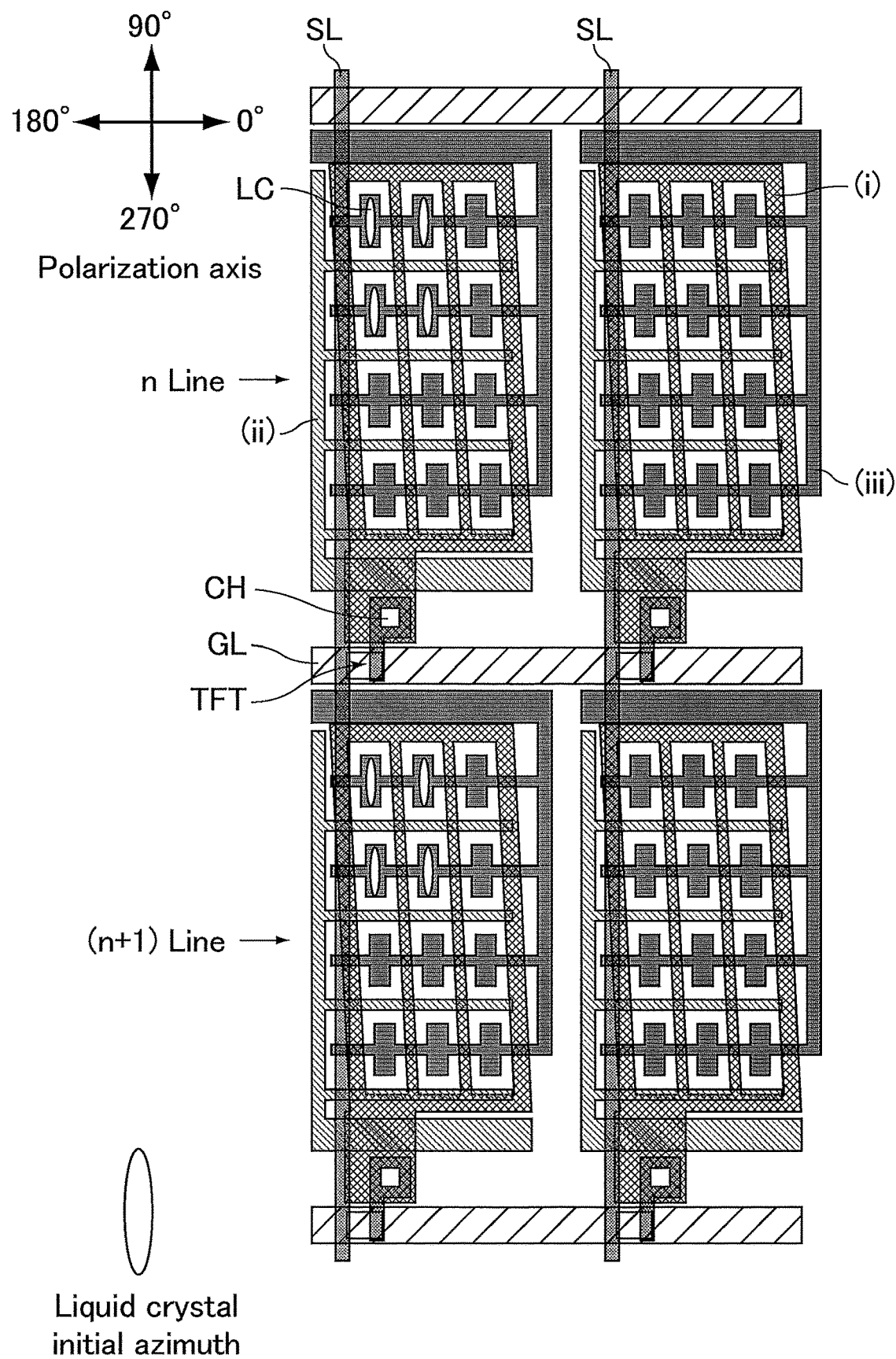
FIG. 18 is a schematic plan view showing an example of a pixel layout in a case where the liquid crystal display device of Example 1 is driven by a TFT.

FIG. 18 is a schematic plan view showing an example of a pixel layout in a case where the liquid crystal display device of Example 1 is driven by a TFT. It is preferred that the lower-layer electrode (ii) and the lower-layer electrode (iii) are scanned and driven, for example, line by line.

From the viewpoint of a transmittance improvement effect, a thin-film transistor element containing an oxide semiconductor is preferably used for the thin-film transistor element in the liquid crystal display device of Embodiment 1. An oxide semiconductor exhibits carrier mobility higher than that of amorphous silicon. Consequently, a transistor area in one pixel can be reduced, so that an aperture ratio can be increased to enhance the transmittance of light per pixel. Therefore, using a thin-film transistor element containing an oxide semiconductor can further improve the contrast ratio. That is, in the liquid crystal display device, preferably the lower substrate includes a thin-film transistor element, and the thin-film transistor element contains an oxide semiconductor. The same holds true for the following embodiments.

The liquid crystal display device of Embodiment 1 can be applied also to any of a transmissive type liquid crystal display device, a reflective type liquid crystal display device, and a transflective type liquid crystal display device. The same holds true for the following embodiments. The same holds true for the following embodiments.

Note that, the upper and lower substrates included in the liquid crystal display device of Embodiment 1 are usually one pair of substrates for holding the liquid crystal therebetween. For example, the conductive line, the electrode, the color filter, and the like are formed on an insulating substrate as required with the insulating substrate made of glass, resin or the like as a matrix, thereby forming the upper and lower substrates. The same holds true for the following embodiments.

The liquid crystal display device of Embodiment 1 can appropriately include a member (such as a light source) included in the typical liquid crystal display device. The liquid crystal display device of Embodiment 1 preferably drives the liquid crystal by an active matrix driving system. The same holds true for the following embodiments.

Examples 2 to 19, Comparative Examples 2 to 8

Figure 19:
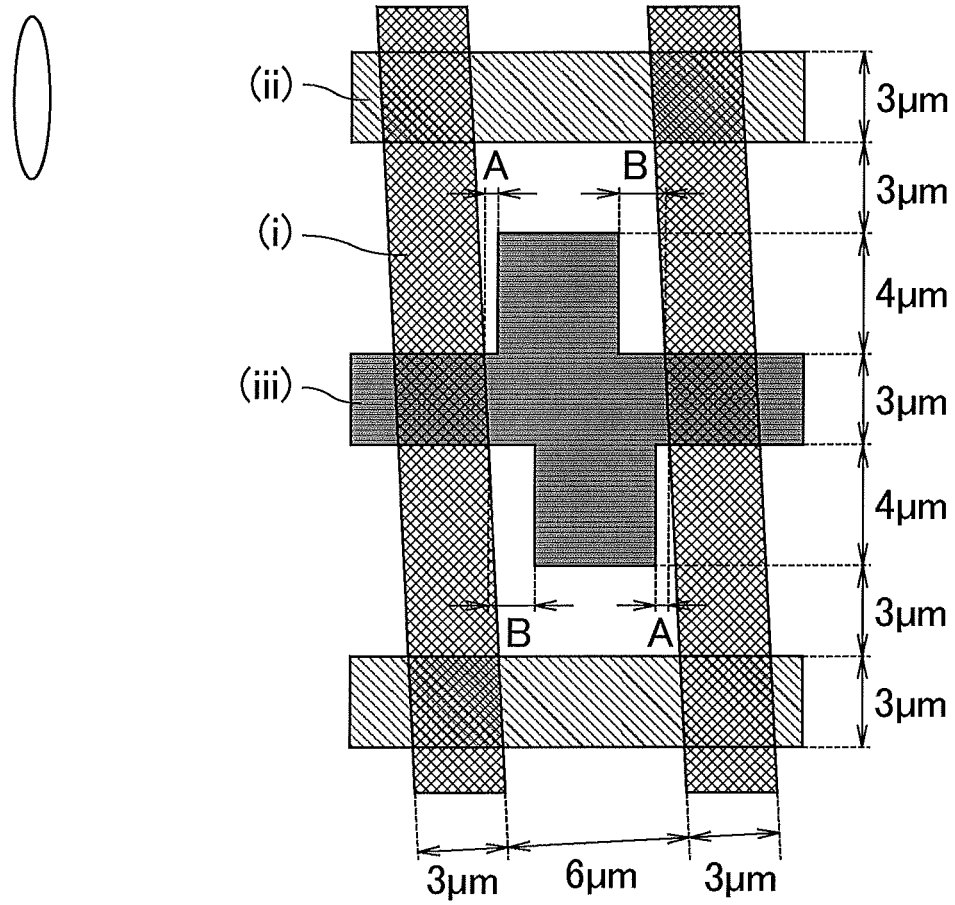
FIG. 19 is a schematic plan view showing details of electrode structures of the pixels and initial alignment of liquid crystal molecules of the liquid crystal display devices of Examples 2 to 19 and Comparative Examples 2 to 8.
Figure 20:
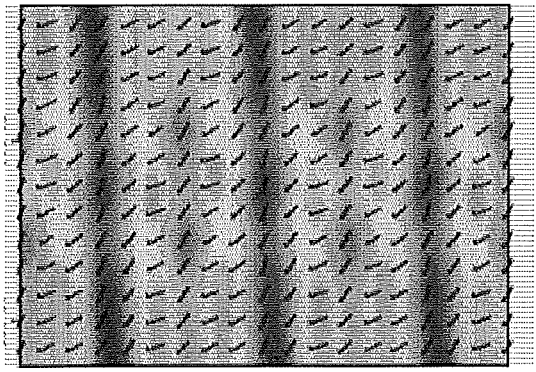
FIG. 20 is a simulation result showing alignment and transmittance distribution of liquid crystal molecules of Example 2.
Figure 21:
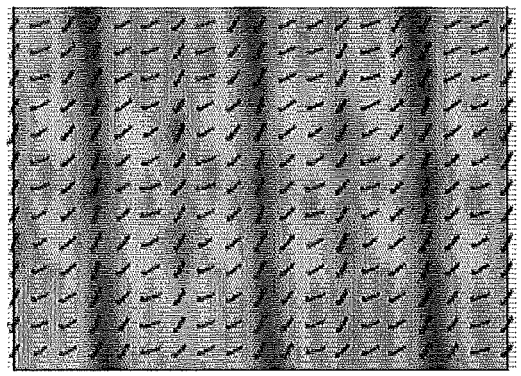
FIG. 21 is a simulation result showing alignment and transmittance distribution of liquid crystal molecules of Example 3.
Figure 22:
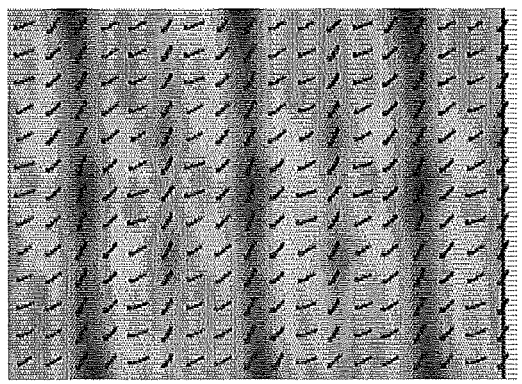
FIG. 22 is a simulation result showing alignment and transmittance distribution of liquid crystal molecules of Example 4.
Figure 23:
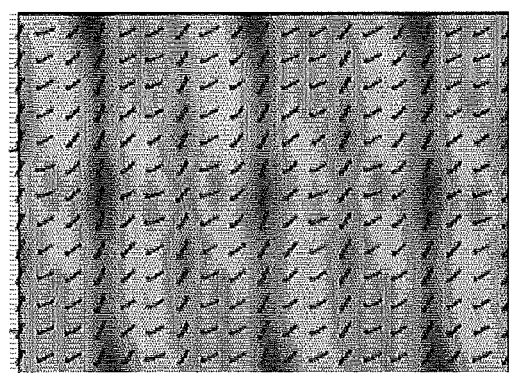
FIG. 23 is a simulation result showing alignment and transmittance distribution of liquid crystal molecules of Example 5.
Figure 24:
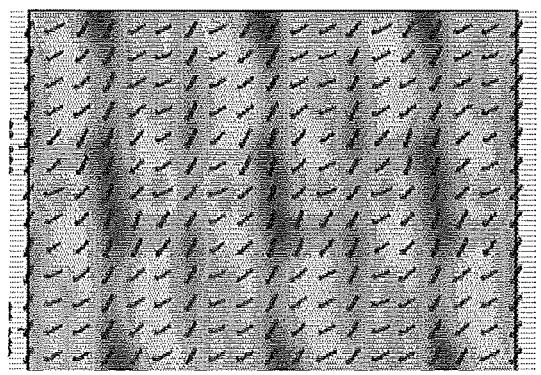
FIG. 24 is a simulation result showing alignment and transmittance distribution of liquid crystal molecules of Example 6.
Figure 25:
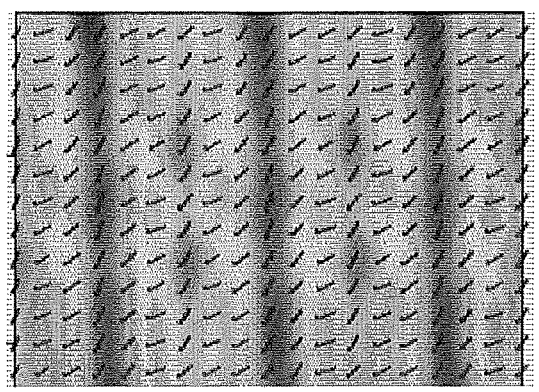
FIG. 25 is a simulation result showing alignment and transmittance distribution of liquid crystal molecules of Example 7.
Figure 26:
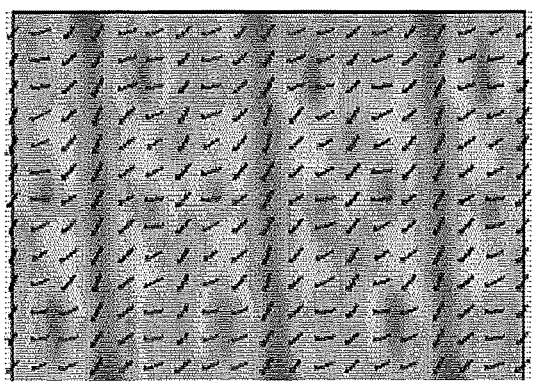
FIG. 26 is a simulation result showing alignment and transmittance distribution of liquid crystal molecules of Example 8.
Figure 27:
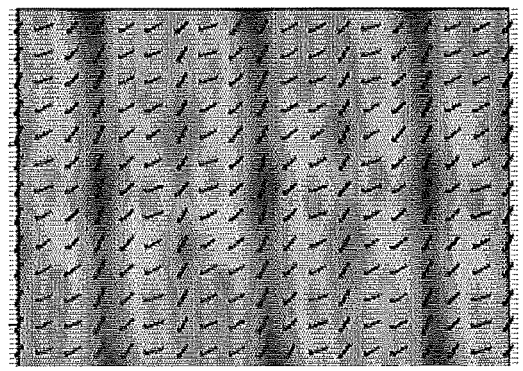
FIG. 27 is a simulation result showing alignment and transmittance distribution of liquid crystal molecules of Example 9.
Figure 28:
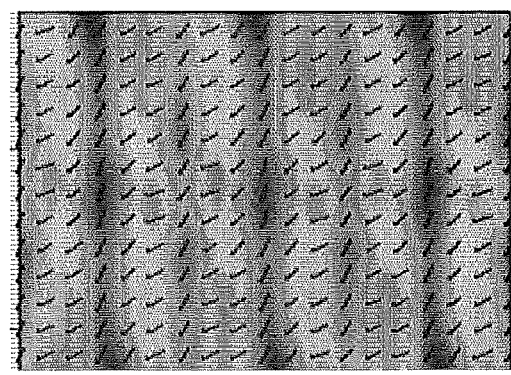
FIG. 28 is a simulation result showing alignment and transmittance distribution of liquid crystal molecules of Example 10.

FIG. 19 is a schematic plan view showing details of the electrode structure of the pixel and initial alignment of liquid crystal molecules in the liquid crystal display devices of Examples 2 to 19 and Comparative Examples 2 to 8. Examples 2 to 19 also correspond to Embodiment 1. Comparative Examples 2 to 8 correspond to Comparative Embodiment 2 to be described later and have the same configuration as that of Embodiment 1 except that the first condition is not satisfied.

As shown in FIG. 19, the electrode width (the narrowest width) L/inter-electrode width S of the upper-layer electrode is set to L/S=3/6 μm in all Examples and Comparative Examples.

Table 4 shows the length A, the length B, and the SN ratio of the electrode structures of Examples 1 to 19 and Comparative Examples 2 to 8.

TABLE 4

|  | A (μm) | B (μm) | SN ratio |
| --- | --- | --- | --- |
| Example 2 | 0 | 0 | 9.13 |
| Example 3 | 0 | 0.5 | 9.22 |
| Example 4 | 0 | 1 | 9.42 |
| Example 5 | 0 | 1.5 | 9.64 |
| Example 6 | 0 | 2 | 8.98 |
| Comparative Example 3 | 0 | 2.5 | 7.15 |
| Example 7 | 0.5 | 0 | 9.22 |
| Example 8 | 0.5 | 0.5 | 8.83 |
| Example 9 | 0.5 | 1 | 9.42 |
| Example 10 | 0.5 | 1.5 | 9.64 |
| Example 11 | 0.5 | 1.75 | 8.57 |
| Comparative Example 4 | 0.5 | 2 | 7.35 |
| Example 12 | 1 | 0 | 9.2 |
| Example 13 | 1 | 0.5 | 9.29 |
| Example 1 | 1 | 1 | 9.49 |
| Example 14 | 1 | 1.5 | 9.66 |
| Example 15 | 1 | 2 | 9.53 |
| Comparative Example 5 | 1 | 2.5 | 8.09 |
| Example 16 | 1.5 | 0 | 9.13 |
| Example 17 | 1.5 | 0.5 | 9.23 |
| Example 18 | 1.5 | 1 | 9.06 |
| Example 19 | 1.5 | 1.5 | 9.63 |
| Comparative Example 2 | 1.5 | 2 | 7.96 |
| Comparative Example 6 | 2 | 0 | 7.06 |
| Comparative Example 7 | 2 | 0.5 | 7 |
| Comparative Example 8 | 2.5 | 0 | 4.74 |

FIGS. 20 to 37 are simulation results showing the alignment and transmittance distribution of the liquid crystal molecules of Examples 2 to 19. FIGS. 38 to 44 are simulation results showing the alignment and transmittance distribution of the liquid crystal molecules of Comparative Examples 2 to 8. These show alignment diagrams and transmittance distributions of the second driving system.

Regarding some conditions (Example 11 and Comparative Examples 2 to 8), in Comparative Examples 2 to 8, since the alignment was destabilized, the rotation of the liquid crystal molecules was smaller than in other regions, or the liquid crystal molecules were rotated in a direction opposite to that in other regions, there were regions where the transmittance was remarkably lower than the other regions (for example, a portion surrounded by a broken line shown in FIGS. 38 to 44). Due to these regions, a target transmittance cannot be obtained by the second driving system. In addition, when the liquid crystal panel is externally pushed or bent, further destabilization of alignment is induced with these regions as a starting point. Note that the regions shown in these Figures correspond to the regions surrounded by the dotted line portion described in FIG. 16.

Figure 29:
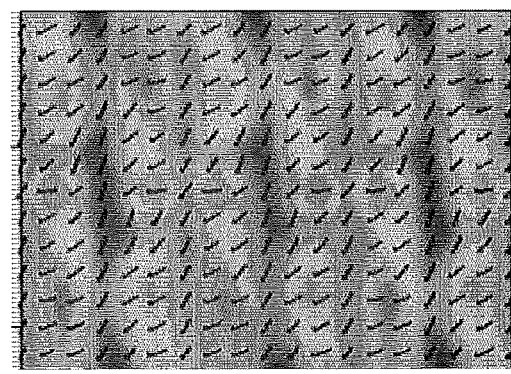
FIG. 29 is a simulation result showing alignment and transmittance distribution of liquid crystal molecules of Example 11.
Figure 30:
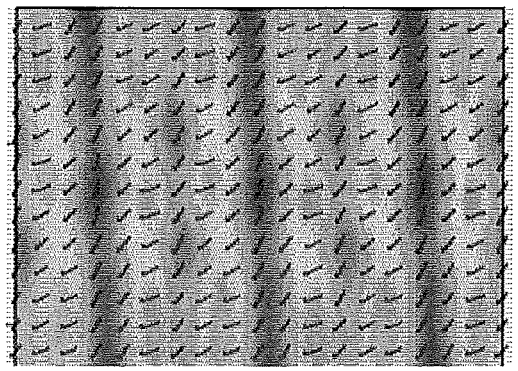
FIG. 30 is a simulation result showing alignment and transmittance distribution of liquid crystal molecules of Example 12.
Figure 31:
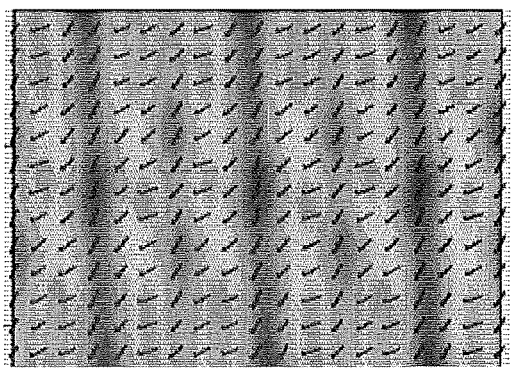
FIG. 31 is a simulation result showing alignment and transmittance distribution of the liquid crystal molecules of Example 13.
Figure 32:
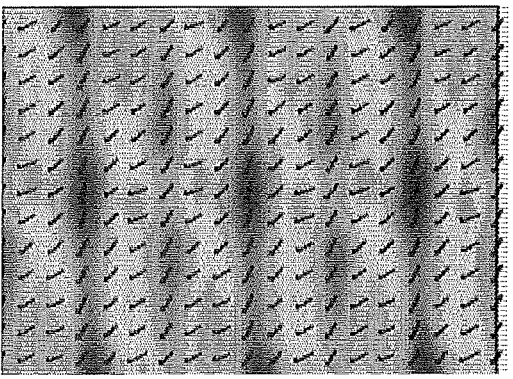
FIG. 32 is a simulation result showing alignment and transmittance distribution of liquid crystal molecules of Example 14.
Figure 33:
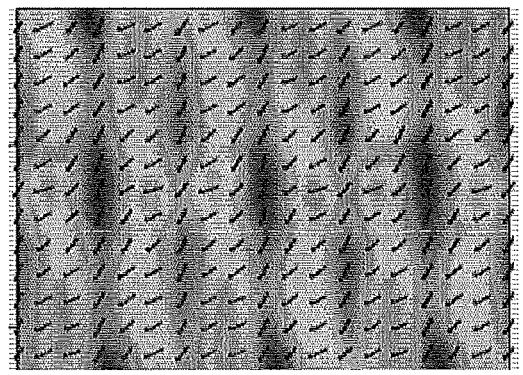
FIG. 33 is a simulation result showing alignment and transmittance distribution of liquid crystal molecules of Example 15.
Figure 34:
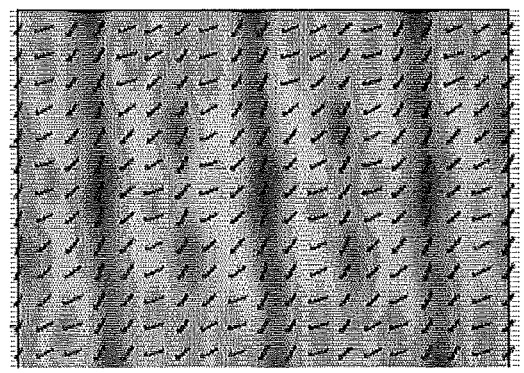
FIG. 34 is a simulation result showing alignment and transmittance distribution of liquid crystal molecules of Example 16.
Figure 35:
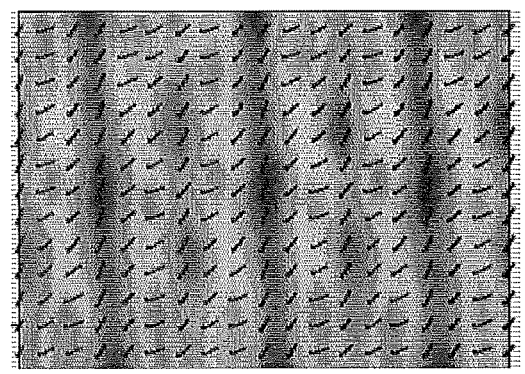
FIG. 35 is a simulation result showing alignment and transmittance distribution of liquid crystal molecules of Example 17.
Figure 36:
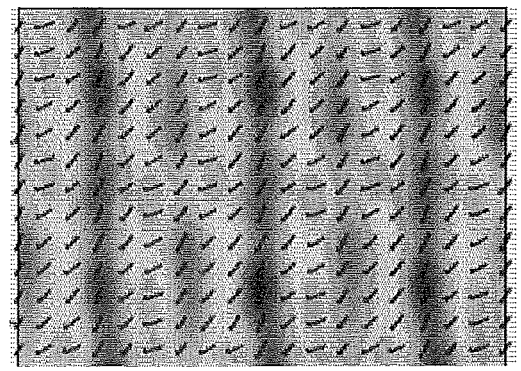
FIG. 36 is a simulation result showing alignment and transmittance distribution of liquid crystal molecules of Example 18.
Figure 37:
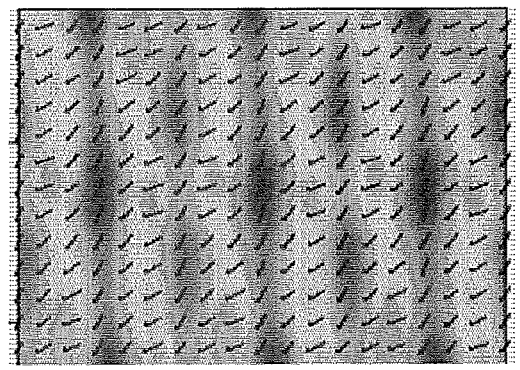
FIG. 37 is a simulation result showing alignment and transmittance distribution of liquid crystal molecules of Example 19.

On the other hand, in Example 11, since the alignment was stable, there was no region where the transmittance was remarkably lower than in other regions, a high transmittance is obtained, and there is no fear that when the liquid crystal panel is externally pushed or bent, the alignment is destabilized (FIG. 29). Therefore, when the SN ratio of 8.5 was used as the reference for alignment stability and 8.5 or more was obtained, it was regarded as stable alignment.

Besides Example 11, Examples 2 to 10 and 12 to 19 were also all stable in alignment and satisfied the SN ratio of 8.5 or more (FIGS. 20 to 28, FIGS. 30 to 37).

Figure 45:
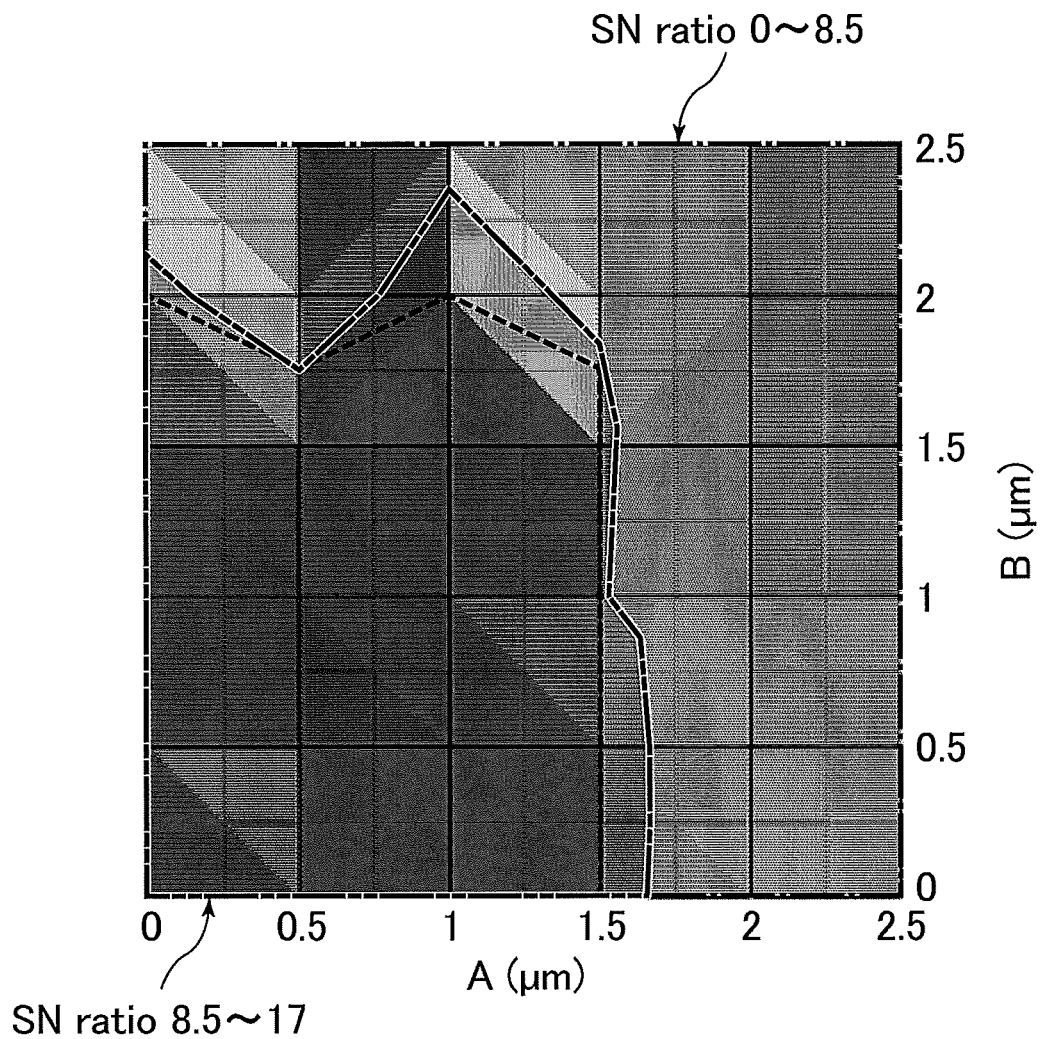
FIG. 45 is a graph showing a distribution of SN ratios.

FIG. 45 is a graph showing a distribution of SN ratios. FIG. 45 shows the distribution of the SN ratios when the horizontal axis represents the value of A and the vertical axis represents the value of B. According to FIG. 45, in the region surrounded by at least two-dot chain lines (the region of SN ratio 8.5 to 17), the alignment is stabilized by the second driving system, and according to one aspect of the present invention, the range may be $$0 \text{ μm} \leq A \leq 1.5 \text{ μm},$$

$$0 \text{ μm} \leq B \leq -0.5A + 2 \text{ μm when } 0 \text{ μm} \leq A \leq 0.5 \text{ μm},$$

$$0 \text{ μm} \leq B \leq 0.5A + 1.5 \text{ μm when } 0.5 \text{ μm} < A \leq 1.0 \text{ μm},$$

$$0 \text{ μm} \leq B \leq -0.5A + 2.5 \text{ μm when } 1.0 \text{ μm} < A \leq 1.5 \text{ μm}.$$

The values of Tr+Td (ms)/transmittance (%) of Examples 1 to 19 and Comparative Example 1 are shown in Table 5 below. In Examples 1 to 19, Tr+Td (ms)/transmittance (%) is smaller than that of Comparative Example 1, so that it can be the that Examples 1 to 19 are superior to Comparative Example 1 as a drive capable of achieving both high speed response and high transmittance.

TABLE 5

|  | Tr + Td (ms)[1] | Transmittance (%)[2] | Tr + Td (ms)/Transmittance (%) |
| --- | --- | --- | --- |
| Example 1 | 16.6 | 34.6 | 0.480 |
| Example 2 | 20.6 | 34.3 | 0.601 |
| Example 3 | 21.3 | 34.4 | 0.619 |
| Example 4 | 21.1 | 34.6 | 0.610 |
| Example 5 | 22.0 | 34.8 | 0.632 |
| Example 6 | 22.7 | 34.6 | 0.655 |
| Example 7 | 22.0 | 34.4 | 0.639 |
| Example 8 | 21.2 | 34.7 | 0.611 |
| Example 9 | 21.1 | 34.6 | 0.610 |
| Example 10 | 21.6 | 34.8 | 0.621 |
| Example 11 | 21.4 | 34.9 | 0.613 |
| Example 12 | 17.0 | 34.3 | 0.496 |
| Example 13 | 17.1 | 34.4 | 0.497 |
| Example 14 | 17.1 | 34.8 | 0.492 |
| Example 15 | 17.3 | 34.8 | 0.498 |
| Example 16 | 16.7 | 34.4 | 0.486 |
| Example 17 | 17.1 | 34.5 | 0.496 |
| Example 18 | 17.2 | 34.3 | 0.502 |
| Example 19 | 17.7 | 34.8 | 0.509 |
| Comparative Example 1 | 29.8 | 34.5 | 0.864 |

Embodiment 2

In the liquid crystal display device of Embodiment 2, a notch as described later is provided in the projection portion of the liquid crystal display device of Embodiment 1, and the values of C1 and C2 relating to the notch satisfy a third condition described later. Other configurations of the liquid crystal display device of Embodiment 2 are the same as those of the liquid crystal display device of Embodiment 1.

Figure 46:
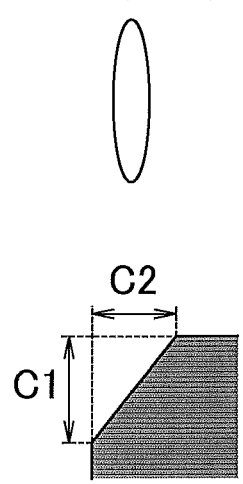
FIG. 46 is a schematic plan view showing details of electrode structures of pixels and initial alignment of liquid crystal molecules of liquid crystal display devices of Examples 20 to 26 and Comparative Examples 9 to 12.
Figure 46:
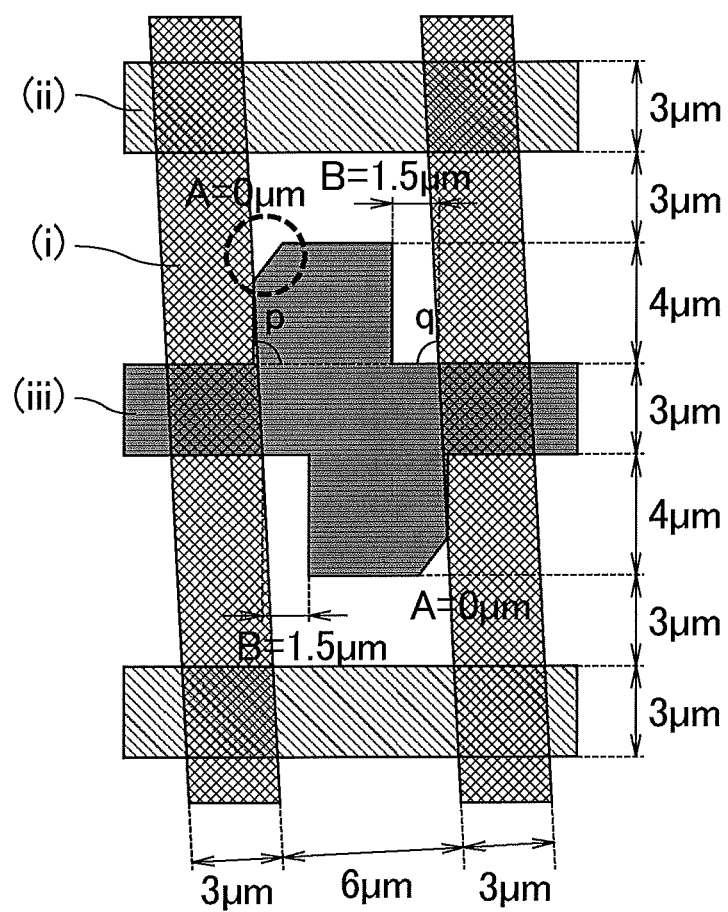

FIG. 46 is a schematic plan view showing details of the electrode structure of the pixel and initial alignment of liquid crystal molecules in the liquid crystal display devices of Examples 20 to 26 and Comparative Examples 9 to 12. Examples 20 to 26 correspond to Embodiment 2. Comparative Examples 9 to 12 correspond to Comparative Embodiment 3 described below and have the same configuration as that of Embodiment 2 except that the second condition and the third condition are not satisfied.

Regarding the electrode width L/the inter-electrode width S of the upper-layer electrode (i), as shown in FIG. 46, L/S=3/6 μm is set in all the examples and comparative examples.

As shown in FIG. 46, by adding a notch defined by specific C1 and C2 to the projection portion, it is possible to further increase the response speed as compared with the case where there is no notch.

The SN ratio of the second driving system and Tr+Td of the first driving system were calculated by fixing the values of A and B to 0 and 1.5 μm respectively and varying the values of C1 and C2, and the ranges of C1 and C2 that increased the speed compared with the condition that the SN ratio was 8.5 or more and Tr+Td without the notch (Example 5) were verified. The length A, length B, C1 and C2, SN ratio and response time of the electrode structures of Examples 5 and 20 to 26 and Comparative Examples 9 to 12 are shown in Table 6 below.

In the case of C1=C2=0 μm, there is no notch in the projection portion of the lower-layer electrode, indicating that the projection portion has a quadrilateral shape.

TABLE 6

| | A (μm) | B (μm) | C1 (μm) | C2 (μm) | SN ratio | Tr + Td (ms) |
|---|---|---|---|---|---|---|
| Example 20 | 0 | 1.5 | 0.5 | 0.5 | 9.61 | 21.7 |
| Example 21 | 0 | 1.5 | 0.5 | 1.5 | 9.49 | 21.4 |
| Example 22 | 0 | 1.5 | 0.5 | 2.5 | 8.57 | 21.7 |
| Comparative Example 9 | 0 | 1.5 | 0.5 | 3.5 | 8.18 | — |
| Example 23 | 0 | 1.5 | 1.5 | 0.5 | 9.49 | 20.9 |
| Example 24 | 0 | 1.5 | 1.5 | 1.5 | 8.86 | 19.8 |
| Comparative Example 10 | 0 | 1.5 | 1.5 | 2.5 | 8.04 | — |
| Example 25 | 0 | 1.5 | 2.5 | 0.5 | 9.48 | 21.8 |
| Comparative Example 11 | 0 | 1.5 | 2.5 | 1.5 | 7.55 | — |
| Comparative Example 12 | 0 | 1.5 | 2.5 | 2.5 | 5.21 | — |
| Example 26 | 0 | 1.5 | 3.5 | 0.5 | 8.94 | 21.6 |
| Example 5 | 0 | 1.5 | 0 | 0 | 9.64 | 22.0 |

Figure 47:
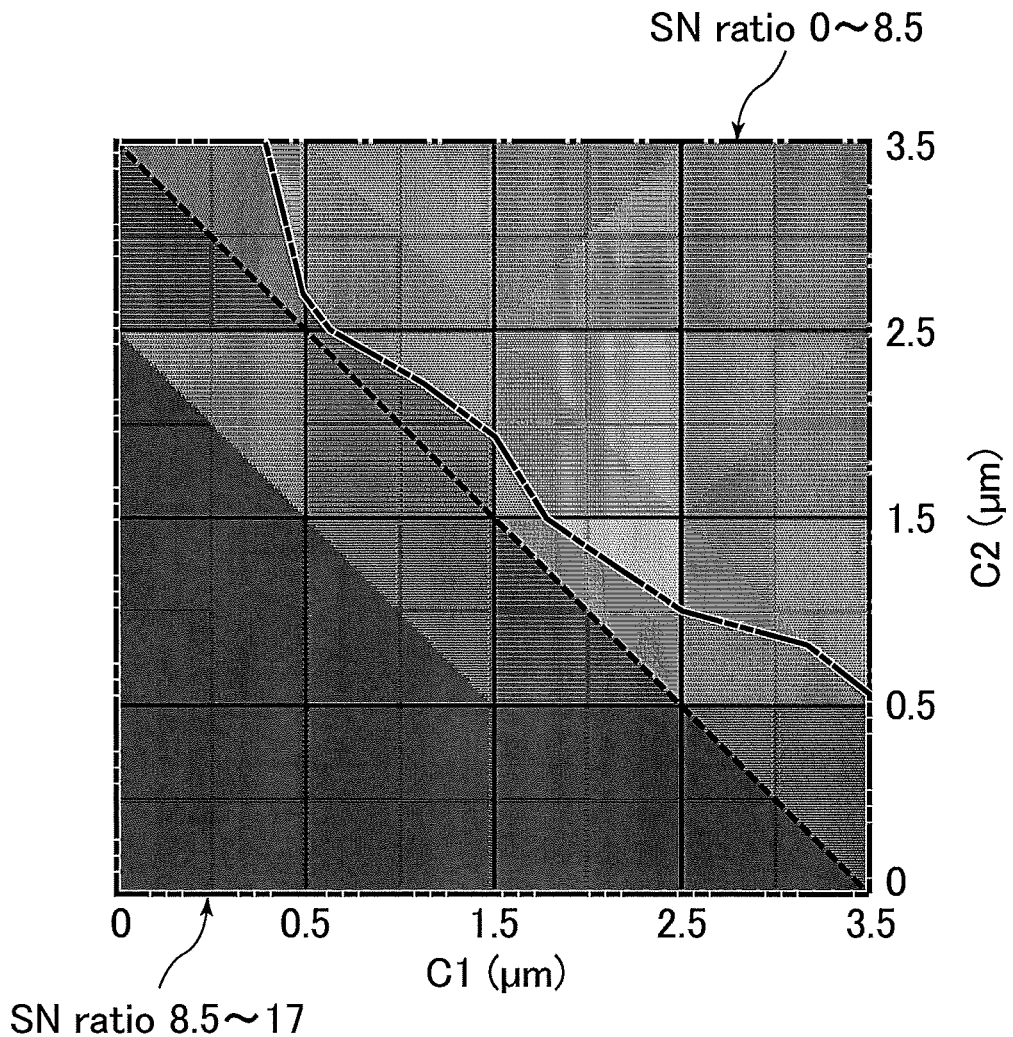
FIG. 47 is a graph showing a distribution of SN ratios.
Figure 48:
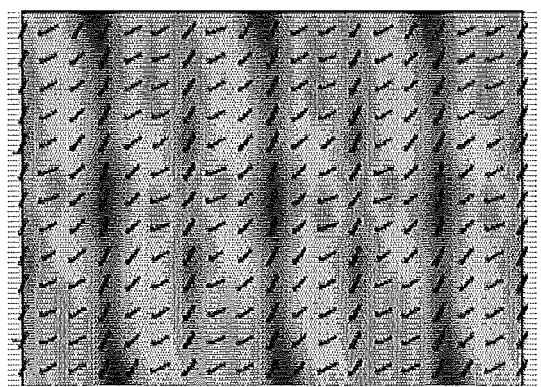
FIG. 48 is a simulation result showing alignment and transmittance distribution of liquid crystal molecules of Example 20.
Figure 49:
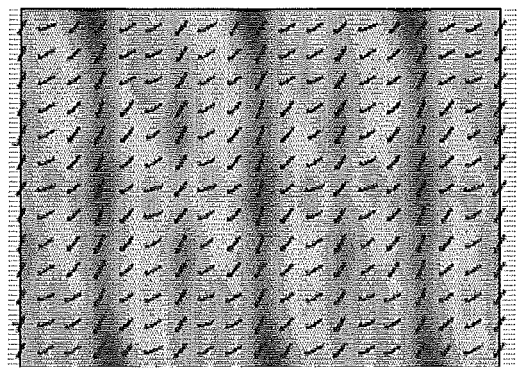
FIG. 49 is a simulation result showing alignment and transmittance distribution of liquid crystal molecules of Example 21.
Figure 50:
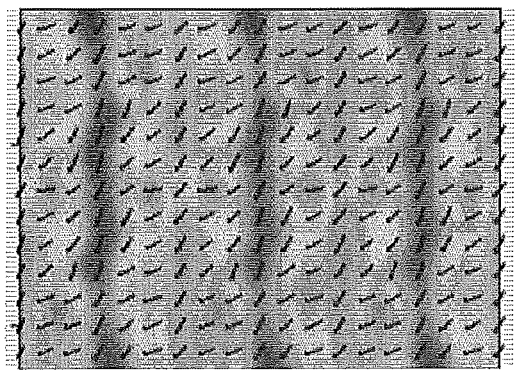
FIG. 50 is a simulation result showing alignment and transmittance distribution of liquid crystal molecules of Example 22.
Figure 51:
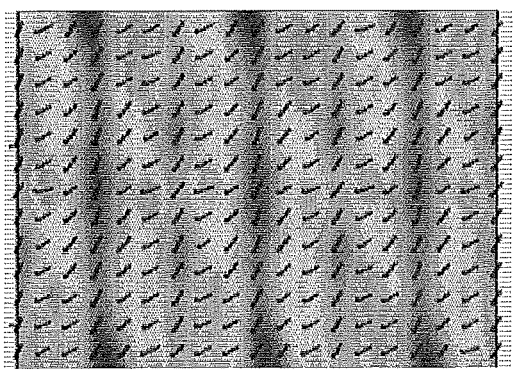
FIG. 51 is a simulation result showing alignment and transmittance distribution of liquid crystal molecules of Example 23.
Figure 52:
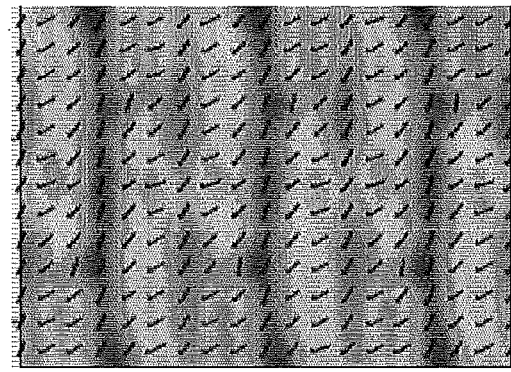
FIG. 52 is a simulation result showing alignment and transmittance distribution of liquid crystal molecules of Example 24.
Figure 53:
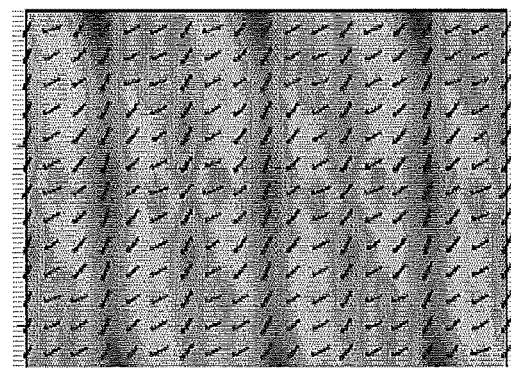
FIG. 53 is a simulation result showing alignment and transmittance distribution of liquid crystal molecules of Example 25.
Figure 54:
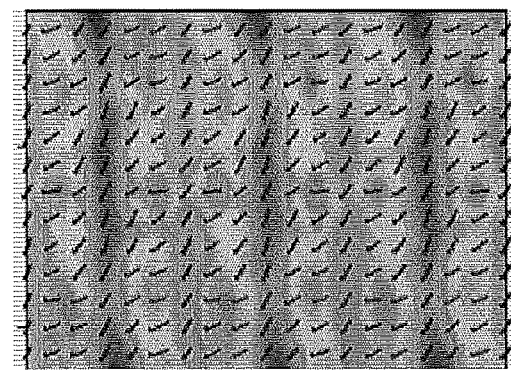
FIG. 54 is a simulation result showing alignment and transmittance distribution of liquid crystal molecules of Example 26.
Figure 55:
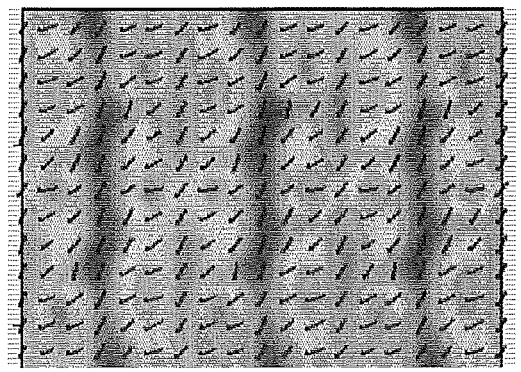
FIG. 55 is a simulation result showing alignment and transmittance distribution of liquid crystal molecules of Comparative Example 9.
Figure 56:
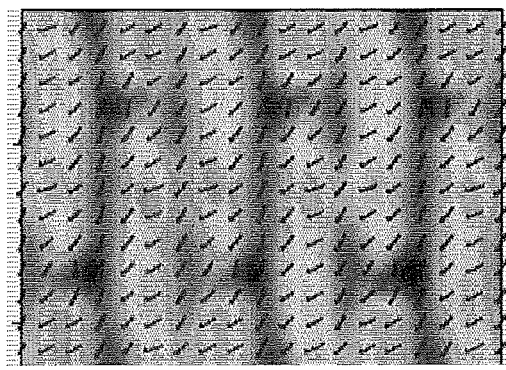
FIG. 56 is a simulation result showing alignment and transmittance distribution of liquid crystal molecules of Comparative Example 10.
Figure 57:
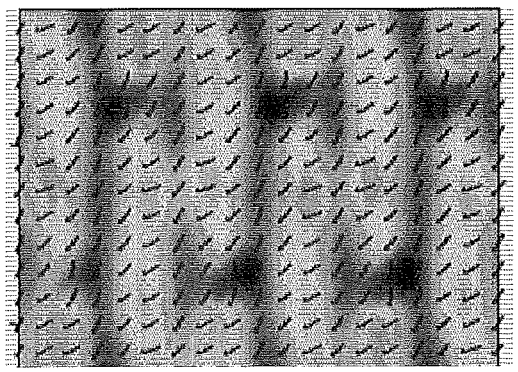
FIG. 57 is a simulation result showing the alignment and transmittance distribution of liquid crystal molecules of Comparative Example 11.
Figure 58:
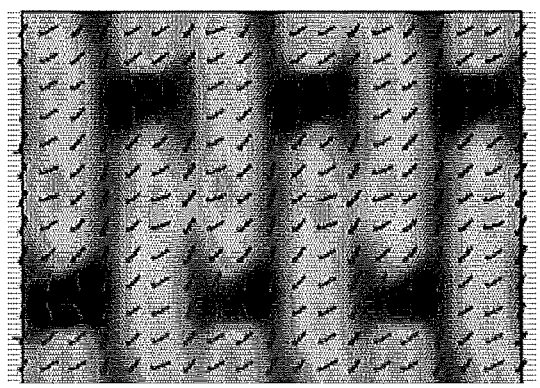
FIG. 58 is a simulation result showing alignment and transmittance distribution of liquid crystal molecules of Comparative Example 12.

FIG. 47 is a graph showing a distribution of SN ratios. FIG. 47 shows the SN ratio distribution when the horizontal axis represents the value of C1 and the vertical axis represents the value of C2. From FIG. 47, in a range surrounded by at least a dotted line, the alignment is stabilized by the second driving system, and the range is 0 μm≤C1≤3.5 μm and 0 μm≤C2≤−C1+3.5 μm (second condition).

In one aspect of the present invention, in order to stabilize the alignment of the second driving system, 0 μm≤A≤1.5 μm, When 0 μm≤A≤0.5 μm, 0 μm≤B≤−0.5A+2 μm When 0.5 μm<A≤1.0 μm, 0 μm≤B≤0.5A+1.5 μm When 1.0 μm<A≤1.5 μm, 0 μm≤B≤−0.5A+2.5 μm
(first condition), are satisfied and the second condition may be satisfied. Furthermore, in order to increase the response speed of the first driving system while stabilizing the alignment of the second driving system, on the premise that the first condition is satisfied,
the projection portion has a shape in which a triangular portion including one of apexes of a quadrilateral shape is cut out from the quadrilateral shape, and it is more preferred to satisfy 0.5 μm≤C1≤3.5 μm and 0.5 μm≤C2≤−C1+3.5 μm (third condition).

FIGS. 48 to 54 are simulation results showing the alignment of the liquid crystal molecules and transmittance distribution of Examples 20 to 26. FIGS. 55 to 58 are simulation results showing the alignment of the liquid crystal molecules and transmittance distribution of Comparative Examples 9 to 12. These show alignment diagrams and transmittance distributions of the second driving system.

Comparative Embodiment 1

Figure 59:
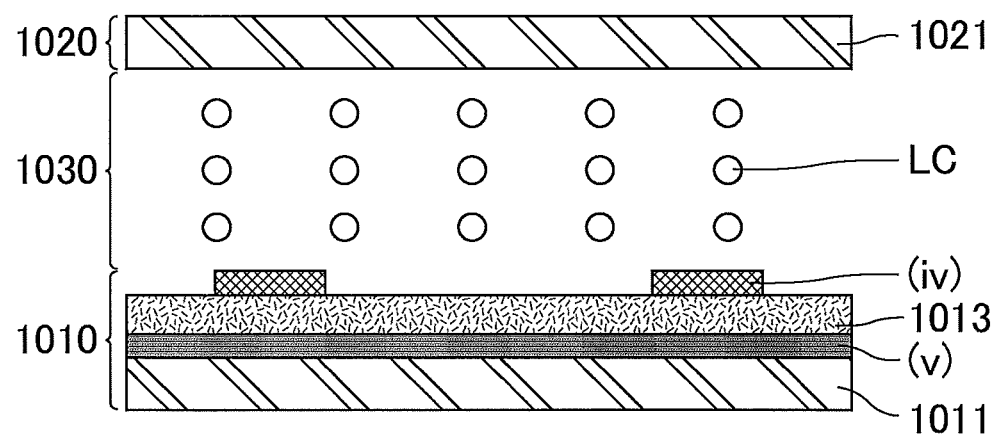
FIG. 59 is a schematic cross-sectional view showing an electrode structure and initial alignment of liquid crystal molecules of a liquid crystal display device of Comparative Embodiment 1.

FIG. 59 is a schematic cross-sectional view showing the electrode structure and initial alignment of liquid crystal molecules of the liquid crystal display device of Comparative Embodiment 1. The configuration of the electrode structure of Comparative Embodiment 1 is the same as the configuration of the electrode structure of the conventional FFS mode liquid crystal display device. The above-described Comparative Example 1 corresponds to Comparative Embodiment 1. Note that FIG. 59 is a schematic cross-sectional view showing a cross section of a portion corresponding to a line segment indicated by a one-dot chain line in FIG. 61 to be described later.

In Comparative Embodiment 1, the lower-layer electrode (v) of the lower substrate 1010 was a planar electrode, and the upper-layer electrode (iv) which was a slit electrode was disposed with the insulating layer 1013 interposed therebetween. Note that a pair of comb-shaped electrodes may be used instead of the slit electrode in the upper-layer electrode (iv) of the lower substrate. No electrode for liquid crystal control was disposed on the upper substrate 1020.

Horizontal alignment films (not shown) were respectively provided on the liquid crystal layer sides of the upper and lower substrates, and liquid crystal molecules when the voltage is not applied were horizontally aligned so that the azimuth angle thereof was 5° with respect to the extending direction of the linear portion of the upper-layer electrode (iv). In addition, polarizing plates (not shown) were provided on the liquid crystal layer side and on the opposite side of the upper and lower substrates, respectively. As the polarizing plates, linear polarizing plates were used, and the linearly polarizing plates were arranged in crossed Nicols in which the polarizing axes of the linearly polarizing plates of the upper and lower substrates were perpendicular or parallel to the major axis of the liquid crystal molecules when the voltage was not applied, thereby forming a normally black mode liquid crystal display device. In addition, the liquid crystal material and its thickness were the same as in Embodiment 1. In the upper-layer electrode (iv), the electrode width L of the linear portion is 3 µm and the electrode interval S between the adjacent linear portions was 6 µm. The dielectric constant ε of the insulating layer 1013 is 6.9. Note that, in the liquid crystal display device of Comparative Embodiment 1, the other components, for example, the alignment film material, the alignment film processing method, the insulating film material and the like are the same as the corresponding members of the liquid crystal display device of Embodiment 1 described above.

In Comparative Embodiment 1, a fringe electric field was generated between the upper-layer electrode (iv) and the lower-layer electrode (v) of the lower substrate, the liquid crystal molecules in the vicinity of the lower substrate were rotated in the same direction in the horizontal plane, thereby performing switching at the time of rising. Switching at the time of falling was performed by weakening the fringe electric field or reducing it to zero and returning the liquid crystal molecules to the original alignment state by viscoelasticity.

However, in the liquid crystal layer, there was a region where the electric field for rotating the liquid crystal molecules was weak, and it would take time to rotate the liquid crystal molecules in the region. Also, in this case, since the liquid crystal molecules rotate in the same direction, distortion due to elastic deformation of the liquid crystal in the horizontal plane is small. Therefore, when switching at the time of falling is performed by weakening the electric field or reducing it to zero, the restoring force due to the elastic strain working to return to the original alignment state is small and the response is slow. Therefore, both the switching at the time of rising and the switching at the time of falling have a slow response time.

Figure 60:
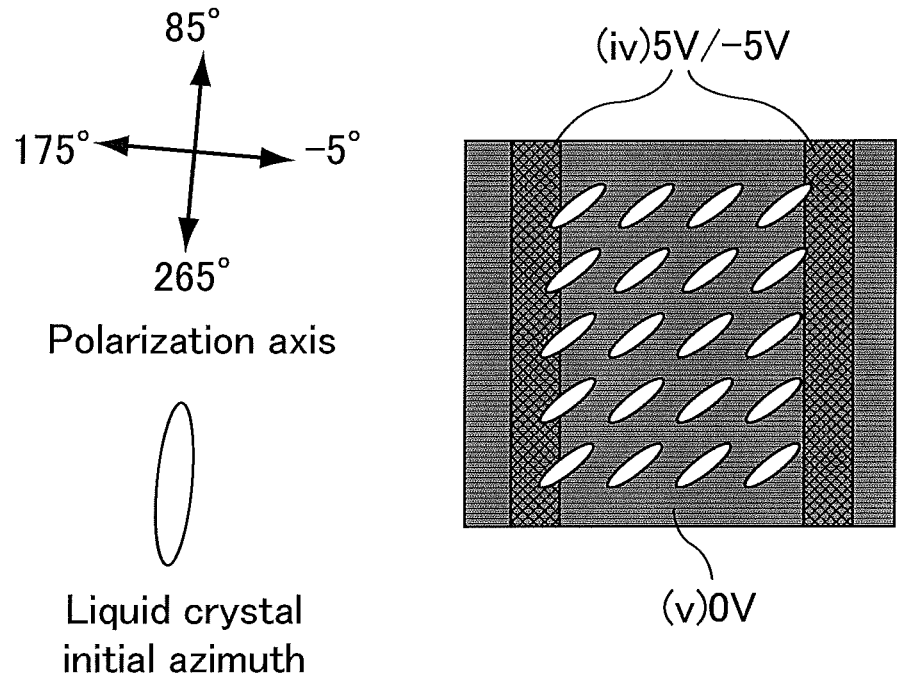
FIG. 60 is a schematic plan view showing a voltage applied to each electrode and alignment of liquid crystal molecules during white display of a liquid crystal display device of Comparative Embodiment 1.
Figure 61:
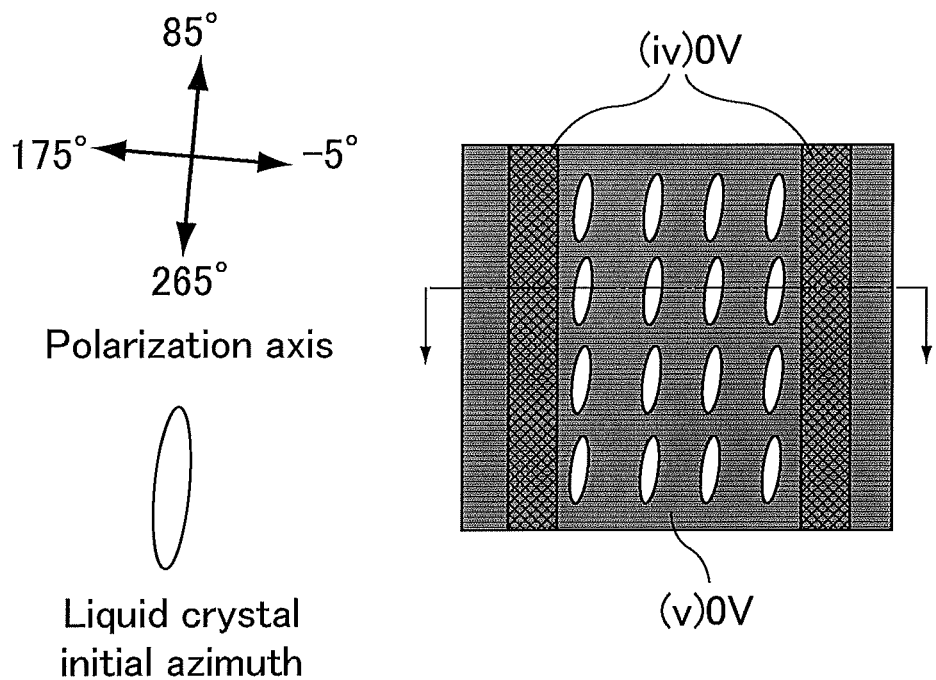
FIG. 61 is a schematic plan view showing a voltage applied to each electrode and alignment of liquid crystal molecules during black display of a liquid crystal display device of Comparative Embodiment 1.

FIG. 60 is a schematic plan view showing a voltage applied to each electrode and alignment of the liquid crystal molecules during the white display of the liquid crystal display device of Comparative Embodiment 1. FIG. 61 is a schematic plan view showing a voltage applied to each electrode and alignment of the liquid crystal molecules during the black display of the liquid crystal display device of Comparative Embodiment 1. FIG. 60 and FIG. 61 show the principle when the voltage is applied in Comparative Embodiment 1.

In the initial alignment, as described above, the liquid crystal molecules are determined to be in a direction forming an angle of 5° with respect to the extending direction of the linear portion of the upper-layer electrode (iv) which is the pixel electrode.

First, the behavior of the liquid crystal molecules at the time of rising will be described in detail.

When a voltage is applied to the upper-layer electrode (iv), a fringe electric field is generated between the upper-layer electrode (iv) and the lower-layer electrode (v). At this time, the liquid crystal rotates away from the alignment azimuth axis to optically modulate from black display to white display. In the present comparative example, 5 V was applied to the upper-layer electrode (iv) with polarity reversal during white gray-scale display.

Next, the behavior of liquid crystal molecules at the time of falling will be described.

When the voltage is turned off, the fringe electric field disappears and the liquid crystal molecule rotates toward the initial alignment orientation (anchoring) due to the restoring force of the liquid crystal molecule which is an elastic body. The alignment film, alignment method, and insulating film necessary for alignment control of the liquid crystal are the same as those described in Embodiment 1.

Comparative Embodiment 2

Figure 62:
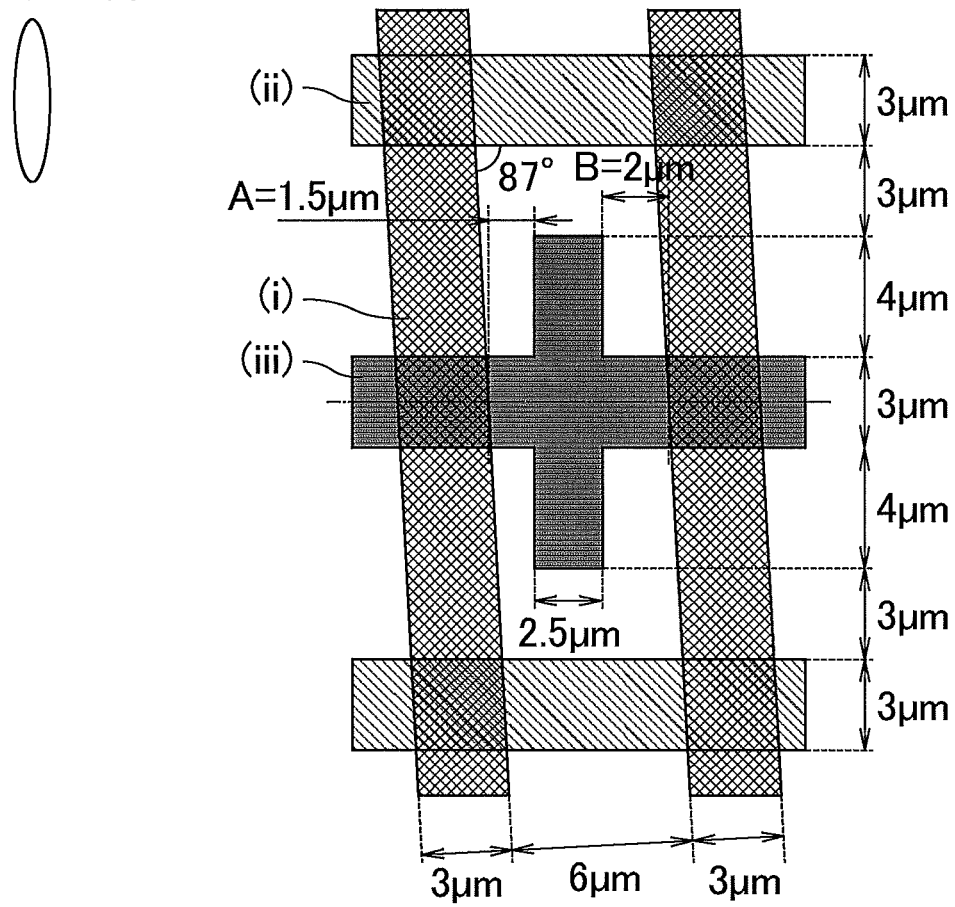
FIG. 62 is a schematic plan view showing an electrode structure of a pixel and initial alignment of liquid crystal molecules of a liquid crystal display device of Comparative Embodiment 2.
Figure 63:
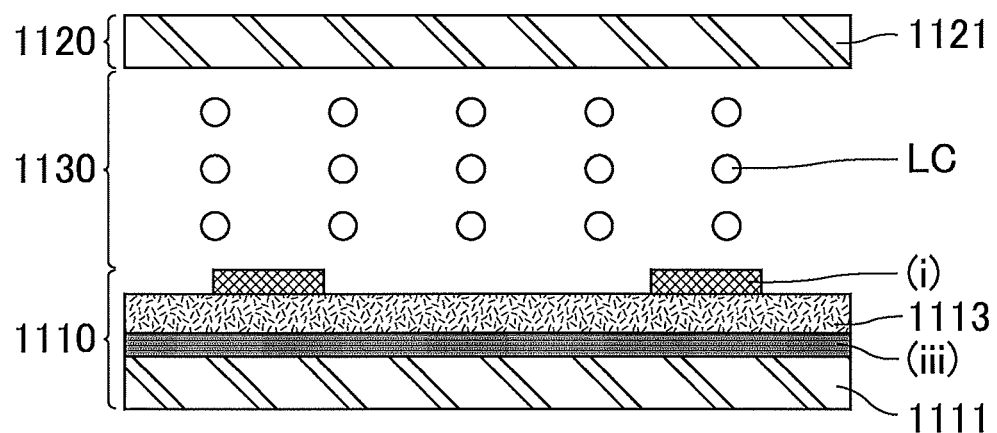
FIG. 63 is a schematic cross-sectional view showing an electrode structure and initial alignment of liquid crystal molecules of a liquid crystal display device of Comparative Embodiment 2.

FIG. 62 is a schematic plan view showing the electrode structure of the pixel and initial alignment of liquid crystal molecules of the liquid crystal display device of Comparative Embodiment 2. FIG. 63 is a schematic cross-sectional view showing the electrode structure and initial alignment of liquid crystal molecules of the liquid crystal display device of Comparative Embodiment 2. Comparative Embodiment 2 has the same configuration as that of Embodiment 1 except that the first condition is not satisfied.

As described above, Comparative Examples 2 to 8 correspond to Comparative Embodiment 2.

The liquid crystal display device of Comparative Embodiment 2 includes an upper-layer electrode (i), a lower-layer electrode (ii), and a lower-layer electrode (iii) on a lower substrate.

The upper-layer electrode (i) includes multiple linear portions when the lower substrate is viewed in a plan view. The linear portions are substantially parallel to each other, and slits substantially parallel to each other are provided between the linear portions, respectively.

Each of the lower-layer electrode (ii) and the lower-layer electrode (iii) is constructed with a trunk portion and a branch portion extending from the trunk portion when the lower substrate is viewed in a plan view. The branch portion is multiple linear portions substantially parallel to each other. A part of the branch portion of the lower-layer electrode (iii) is wider.

The extending direction of the branches of each of the lower-layer electrode (ii) and the lower-layer electrode (iii) was set to be in a direction forming 87° with respect to the extending direction of the linear portion of the upper-layer electrode (i). Further, in the upper-layer electrode (i), the electrode width of the linear portion is 3 µm, and the electrode interval between the adjacent linear portions is 6 µm. In the branch portions of a pair of comb-shaped electrodes composed of the lower-layer electrode (ii) and the lower-layer electrode (iii), the electrode width of the linear portion is 3 µm, the width of the projection portion of the lower-layer electrode (iii) is 4 µm, and the length of the projection portion is 2.5 µm. The distance between the lower-layer electrode (ii) and the projection portion of the lower-layer electrode (iii) is 3 µm.

Here, as shown in FIG. 62, the length A is 1.5 µm and the length B is 2 µm, which does not satisfy the above-mentioned first condition. In Comparative Example 2 corresponding to Comparative Embodiment 2 as described above, the SN ratio is calculated to be 7.96 as shown in Table 4 and the like.

The other configuration of the liquid crystal display device of Comparative Embodiment 2 is the same as that of Embodiment 1 (Example 1).

Figure 64:
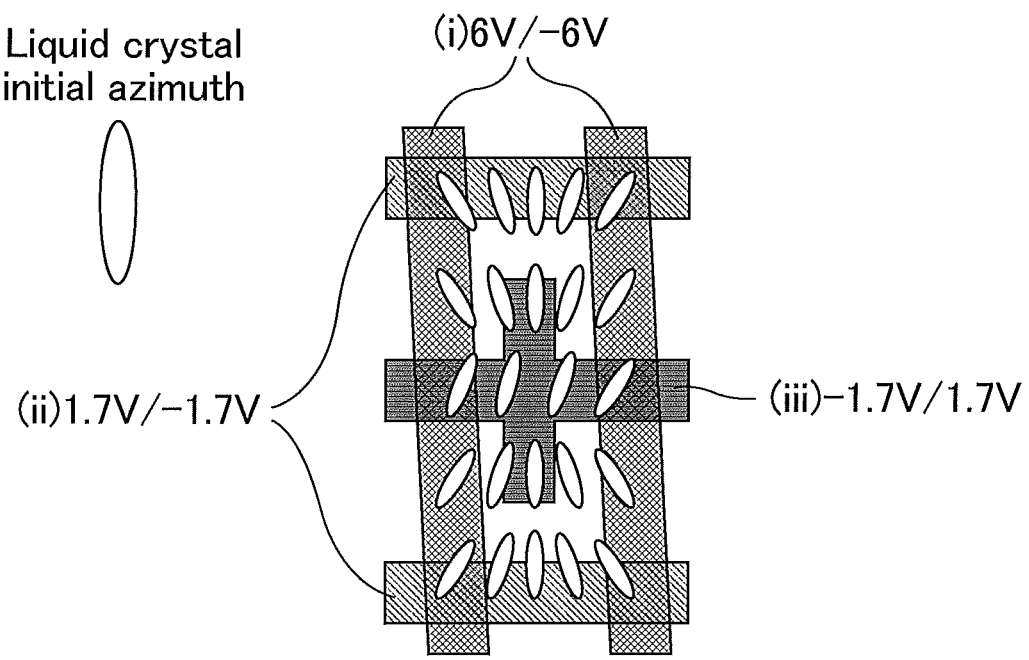
FIG. 64 is a schematic plan view showing a voltage applied to each electrode and alignment of liquid crystal molecules during white display of a first driving system of Comparative Embodiment 2.
Figure 65:
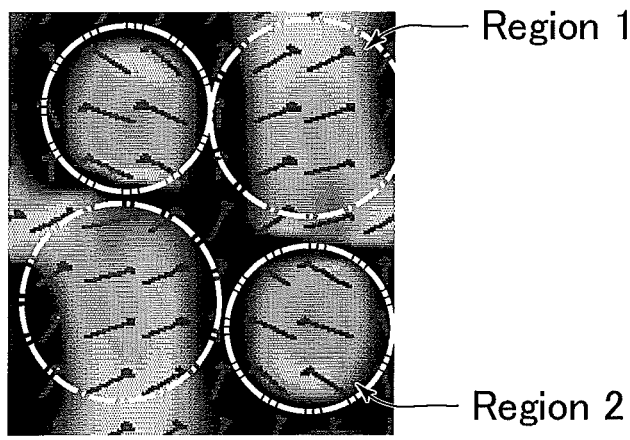
FIG. 65 is a simulation result showing a director distribution and a transmittance distribution corresponding to FIG. 64.

FIG. 64 is a schematic plan view showing a voltage applied to each electrode and alignment of the liquid crystal molecules during the white display of the first driving system of Comparative Embodiment 2. FIG. 65 is a simulation result showing a director distribution and a transmittance distribution corresponding to FIG. 64.

Figure 66:
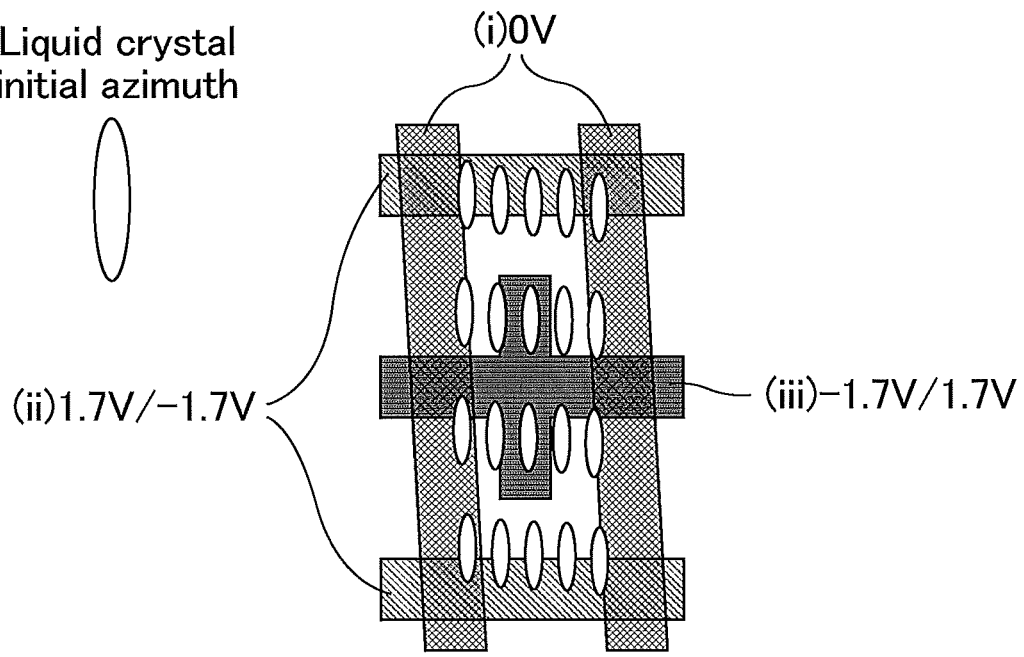
FIG. 66 is a schematic plan view showing a voltage applied to each electrode and alignment of liquid crystal molecules during black display of the first driving system of Comparative Embodiment 2.
Figure 67:
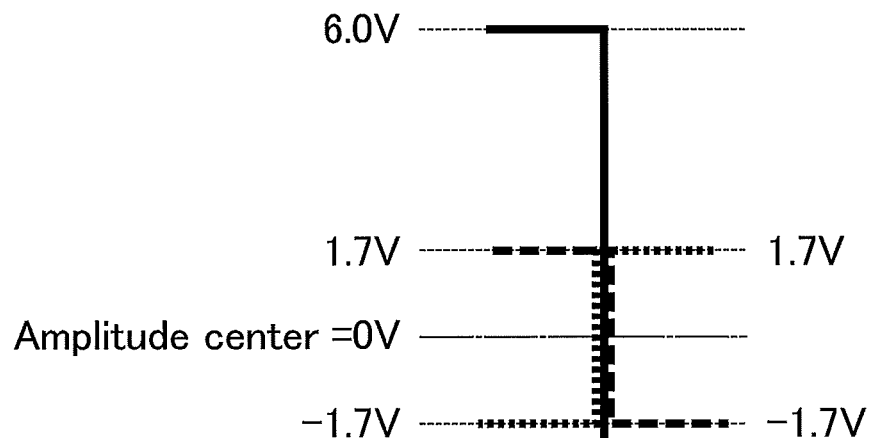
FIG. 67 is a voltage relationship diagram showing a voltage applied to each electrode during white display of the first driving system of Comparative Embodiment 2.

FIG. 66 is a schematic plan view showing a voltage applied to each electrode and alignment of the liquid crystal molecules during the black display of the first driving system of Comparative Embodiment 2. FIG. 67 is a voltage relationship diagram showing a voltage applied to each electrode during the white display of the first driving system of Comparative Embodiment 2.

The voltage application method and alignment are the same as in Example 1.

Figure 68:
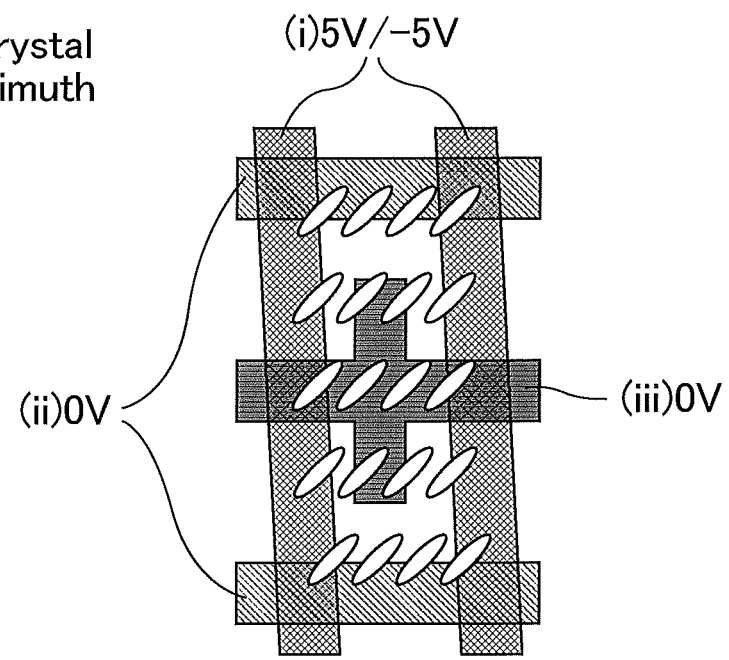
FIG. 68 is a schematic plan view showing a voltage applied to each electrode and alignment of liquid crystal molecules during white display of a second driving system of Comparative Embodiment 2.
Figure 69:
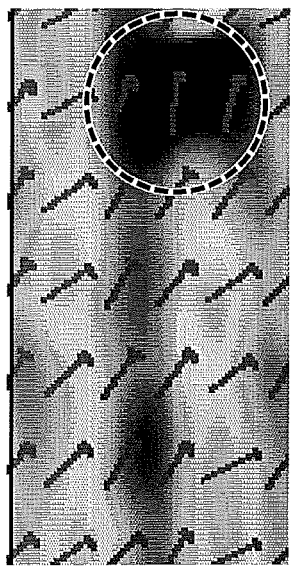
FIG. 69 is a simulation result showing a director distribution and a transmittance distribution corresponding to FIG. 68.
Figure 70:
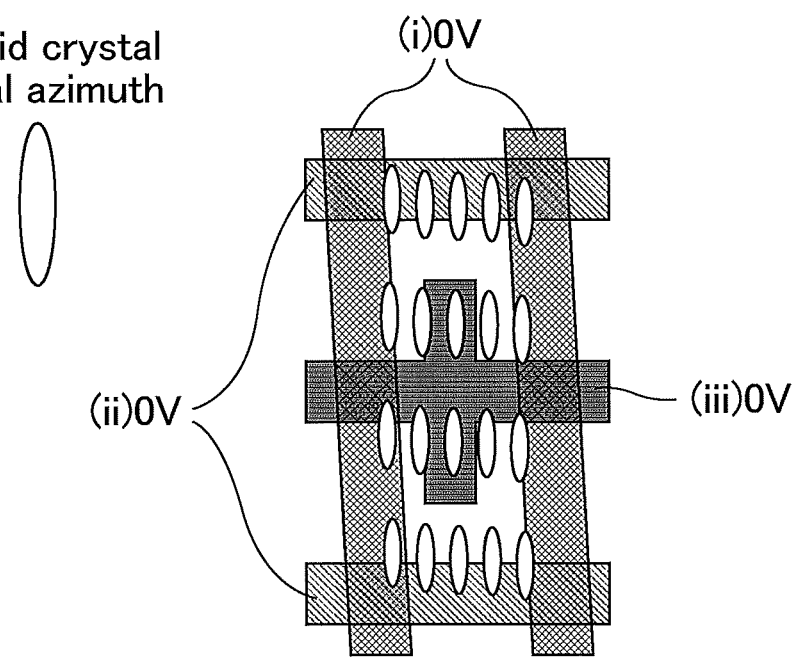
FIG. 70 is a schematic plan view showing a voltage applied to each electrode and alignment of liquid crystal molecules during black display of the second driving system of Comparative Embodiment 2.

FIG. 68 is a schematic plan view showing a voltage applied to each electrode and alignment of the liquid crystal molecules during the white display of the second driving system of Comparative Embodiment 2. FIG. 69 is a simulation result showing a director distribution and a transmittance distribution corresponding to FIG. 68. FIG. 70 is a schematic plan view showing a voltage applied to each electrode and alignment of the liquid crystal molecules during the black display of the second driving system of Comparative Embodiment 2.

The voltage application method is the same as in Example 1.

Regarding the alignment, when white display is performed by rapidly changing the voltage of the upper layer slit electrode from 0 V to 5 V, as shown in a region surrounded by a broken line in FIG. 69 in Comparative Embodiment 2, liquid crystal molecules are rotated in the opposite direction in some regions, and as a result the transmittance decreases.

Comparative Embodiment 3

In the liquid crystal display device of Comparative Embodiment 3, notches are provided in the projection portion of the liquid crystal display device as in Embodiment 2, but the values of C1 and C2 related to the notches do not satisfy the second condition and the third condition. Other configurations of the liquid crystal display device of Comparative Embodiment 3 are the same as those of Embodiment 2. As described above, Comparative Examples 9 to 12 correspond to Comparative Embodiment 3.

Therefore, in order to stabilize the alignment of the second driving system, according to one aspect of the present invention, the first condition and the second condition may be satisfied.

In order to increase also the response speed of the first driving system while stabilizing the alignment of the second driving system, it is preferred to satisfy the third condition on the premise that the first condition is satisfied.

In the liquid crystal display device of the present embodiments described above, the display can be performed by appropriately switching between the first driving system and the second driving system. In each driving system, according to a desired display, the display can be performed by appropriately combining the white display and the black display.

The liquid crystal display device of the present invention preferably includes a control device that performs the first driving system, and more preferably includes a control device that performs the first driving system and the second driving system in a switching manner. This makes it possible to achieve a high-speed response together with a wide viewing angle while achieving a sufficiently superior contrast ratio and to achieve a high transmittance. Thus, the liquid crystal display device that satisfies all the characteristics of the high-speed response, the wide viewing angle, the high contrast ratio, and the high transmittance with one type of electrode configuration can be realized.

Preferably, the liquid crystal display device of the present invention includes a control device that automatically switches between the first driving system and the second driving system according to a predetermined condition. For example, preferably the control device is equipped with a temperature sensor, and automatically switches between the first driving system and the second driving system according to the temperature. For example, preferably the control device performs the second driving system capable of achieving high transmittance in an environment of a temperature at which a delay of the response speed is not a problem (for example, a temperature range where the lower limit is any one of −20° C. to 20° C.), and performs the first driving system capable of achieving high-speed response in an environment of a low temperature (for example, a temperature range where the upper limit is any one of −20° C. to 20° C.) at which the response speed becomes slow. Consequently, the desired effects can be obtained more appropriately.

Further, the liquid crystal display device of the present invention may include a control device that switches between the first driving system and the second driving system in response to a user's instruction.

The present invention may be a liquid crystal display device driving method using the liquid crystal display device described above.

In the case that the AC drive of the liquid crystal in which the AC voltage is applied only to the electrode included in the lower substrate may be performed like the liquid crystal display device of the present invention, the circuit for AC drive, the driver, and the conductive line may be disposed only in the electrode of the lower substrate as in the past. Thus, for example, a degree of freedom of driving the liquid crystal display device of the present invention is particularly higher than that of the liquid crystal display device in which the circuit for AC drive, the driver, and the conductive line are disposed on both the upper and lower substrates in order to apply the AC voltage to the electrodes of the upper and lower substrates to perform the AC drive of the liquid crystal.

Examples of the liquid crystal-display device of the present invention include an in-vehicle device such as a car navigation system, an electronic book reader, a digital photo frame, an industrial appliance, a television, a personal computer, a smart phone, and a tablet terminal. The present invention is preferably applied to a device, such as the in-vehicle device such as the car navigation system, which can be used in both a high-temperature environment and a low-temperature environment.

Note that, in the lower substrate, the electrode structure and the like of the liquid crystal display device of the present invention can be checked by microscopic observation using a scanning electron microscope (SEM), for example.

REFERENCE SIGNS LIST (i): upper-layer electrode
(ii): lower-layer electrode
(iii): lower-layer electrode
(iv): upper-layer electrode
(v): lower-layer electrode
CH: contact hole
TFT: thin-film transistor element
SL: source bus line
GL: gate bus line
LC: liquid crystal molecule
10, 1010: lower substrate
11, 21, 1011, 1021: glass substrate
13, 1013: insulating layer
20, 1020: upper substrate
30, 1030: liquid crystal layer

The invention claimed is:

1. A liquid crystal display device comprising an upper substrate and a lower substrate; and a liquid crystal layer sandwiched between the upper and lower substrates, wherein the lower substrate includes a first electrode and a second electrode and a third electrode arranged in a layer different from the first electrode, the first electrode has multiple linear portions and an opening is provided between the linear portions, the second electrode and the third electrode are a pair of comb-shaped electrodes, each of the comb-shaped electrodes has a trunk portion and multiple branch portions branching from the trunk portion, at least one of the branch portions of the third electrode has a narrow portion which is narrowest and a projection portion which is wider than the narrow portion, the projection portion is present in the opening of the first electrode when the lower substrate is viewed in a plan view so that the projection portion is directed to an upper side of upper, lower, right, and left sides, one of angles on the upper side and on the opening side formed by a contour line of the opening on each of the left and right sides of the projection portion and the narrow portion of the branch portion of the third electrode in the opening is an obtuse angle or a right angle and the other is an acute angle or a right angle, the projection portion satisfies following Formulae (1) and (2-1) to (2-3) where A is a length of the narrow portion on the side where the angle is an obtuse angle or a right angle and B is a length of the narrow portion on the side where the angle is an acute angle or a right angle, among the left and right sides of the projection portion, the projection portion has a quadrilateral shape or a shape in which from a quadrilateral shape, a triangular portion including one of apexes of the quadrilateral shape is cut out, the projection portion satisfies following Formulae (3) and (4) where C1 is a length of a portion of the triangular portion along the linear portion of the first electrode and C2 is a length of a portion of the triangular portion along the linear portion of the branch portion of the second electrode, and the liquid crystal layer contains liquid crystal molecules aligned in the horizontal direction when no voltage is applied, $$0 \ \mu m \leq A \leq 1.5 \ \mu m \tag{1}$$

$$0 \ \mu m \leq B \leq -0.5 \ A + 2 \ \mu m \text{ when } 0 \ \mu m \leq A \leq 0.5 \ \mu m \tag{2-1}$$

$$0 \ \mu m \leq B \leq 0.5 \ A + 1.5 \ \mu m \text{ when } 0.5 \ \mu m < A \leq 1.0 \ \mu m \tag{2-2}$$

$$0 \ \mu m \leq B \leq -0.5 \ A + 2.5 \ \mu m \text{ when } 1.0 \ \mu m < A \leq 1.5 \ \mu m \tag{2-3}$$

$$0 \ \mu m \leq C1 \leq 3.5 \ \mu m \tag{3}$$

$$0 \ \mu m \leq C2 \leq -C1 + 3.5 \ \mu m \tag{4}$$

2. The liquid crystal display device according to claim 1, wherein the projection portion has a shape in which from a quadrilateral shape, a triangular portion including one of apexes of the quadrilateral shape is cut out, and following Formulae (5) and (6) are satisfied, $$0.5 \ \mu m \leq C1 \leq 3.5 \ \mu m \tag{5}$$

$$0.5 \ \mu m \leq C2 \geq -C1 + 3.5 \ \mu m \tag{6}$$

3. The liquid crystal display device according to claim 1, wherein multiple linear portions of the first electrode form an angle of 20° to 90° with respect to an extending direction of the branch portion of the second electrode.

4. The liquid crystal display device according to claim 1, wherein the first electrode is provided with a slit or is a comb-shaped electrode.

5. The liquid crystal display device according to claim 1, wherein the liquid crystal display device is configured to execute a driving operation of causing an electrode provided in the lower substrate to generate an electric field that rotates a first group of the liquid crystal molecules in a horizontal plane with respect to a main surface of the upper and lower substrates and rotates a second group of the liquid crystal molecules in a direction opposite to the first group of the liquid crystal molecules in a horizontal plane with respect to the main surface.

6. The liquid crystal display device according to claim 5, wherein the driving operation causes an electrode provided in the lower substrate to generate an electric field that rotates the liquid crystal molecules so that two or more first regions and two or more second regions are alternately arranged in a pixel, the first regions each rotating the first group of the liquid crystal molecules in a horizontal plane with respect to the main surface, the second regions each rotating the second group of the liquid crystal molecules in a direction opposite to the first group of the liquid crystal molecules in a horizontal plane with respect to the main surface.

7. The liquid crystal display device according to claim 5, configured to execute a first driving system and a second driving system in a switching manner, wherein the first driving system executes the driving operation, and the second driving system executes a driving operation of causing the electrode to generate an electric field that rotates the liquid crystal molecules so that the number of first regions is one or less and the number of second regions is one or less in a pixel, the first regions each rotating the first group of the liquid crystal molecules in a horizontal plane with respect to the main surface, the second regions each rotating the second group of the liquid crystal molecules in a direction opposite to the first group of the liquid crystal molecules in a horizontal plane with respect to the main surface.

8. The liquid crystal display device according to claim 1, wherein the first electrode is disposed closer to the liquid crystal layer than the second electrode and the third electrode.

9. The liquid crystal display device according to claim 1, wherein the second electrode and the third electrode are arranged in the same layer.

10. The liquid crystal display device according to claim 1, wherein the liquid crystal molecules have positive anisotropy of dielectric constant.

11. The liquid crystal display device according to claim 1, wherein the lower substrate includes a thin-film transistor element, and the thin-film transistor element contains an oxide semiconductor.

* * * * *